(12) United States Patent
Dawar et al.

(10) Patent No.: US 11,751,008 B2
(45) Date of Patent: Sep. 5, 2023

(54) ANGLE OF ARRIVAL CAPABILITY IN ELECTRONIC DEVICES

(71) Applicant: Samsung Electronics Co., Ltd., Suwon-si (KR)

(72) Inventors: Neha Dawar, Plano, TX (US); Hoang Viet Nguyen, Plano, TX (US); Yuming Zhu, Plano, TX (US); Boon Loong Ng, Plano, TX (US); Yi Yang, Suwon-si (KR); Moonseok Kang, Suwon-si (KR); Aditya Vinod Padaki, Richardson, TX (US); Songwei Li, McKinney, TX (US); Moongee Cho, Seoul (KR); Hyunchul Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 119 days.

(21) Appl. No.: 17/443,321

(22) Filed: Jul. 23, 2021

(65) Prior Publication Data

US 2022/0038846 A1 Feb. 3, 2022

Related U.S. Application Data

(60) Provisional application No. 63/059,043, filed on Jul. 30, 2020.

(51) Int. Cl.
*H04W 4/021* (2018.01)
*H04B 17/318* (2015.01)
*G01S 5/02* (2010.01)

(52) U.S. Cl.
CPC .......... *H04W 4/021* (2013.01); *G01S 5/0284* (2013.01); *H04B 17/318* (2015.01)

(58) Field of Classification Search
None
See application file for complete search history.

(56) References Cited

U.S. PATENT DOCUMENTS

| | | | |
|---|---|---|---|
| 8,237,101 | B2 | 8/2012 | Gunning, III et al. |
| 10,153,549 | B2 | 12/2018 | Robinson et al. |
| | | (Continued) | |

FOREIGN PATENT DOCUMENTS

| | | |
|---|---|---|
| CN | 104502900 B | 3/2017 |
| EP | 3561542 A1 | 10/2019 |

OTHER PUBLICATIONS

International Search Report and Written Opinion of the International Searching Authority in connection with International Application No. PCT/KR2021/009982 dated Nov. 10, 2021, 6 pages.

(Continued)

*Primary Examiner* — Adolf Dsouza

(57) ABSTRACT

A method includes obtaining channel information, range information, and angle of arrival (AoA) information based on wireless signals communicated between an electronic device and an external electronic device. The method also includes generating an initial prediction of a presence of the external electronic device relative to a field of view (FoV) of the electronic device based on the channel information and at least one of the range information or the AoA information. The initial prediction includes an indication of whether the external electronic device is within the FoV or outside the FoV of the electronic device. The method further includes performing, using a tracking filter, a smoothing operation on the range information and the AoA information. Additionally, the method includes determining that the external electronic device is within the FoV of the electronic device based on the AoA information, the smoothed AoA information, and the initial prediction.

27 Claims, 18 Drawing Sheets

(56) References Cited

U.S. PATENT DOCUMENTS

| | | | |
|---|---|---|---|
| 10,356,553 B2* | 7/2019 | Sant | G01S 5/14 |
| 2012/0268316 A1 | 10/2012 | Kanamoto | |
| 2014/0375982 A1 | 12/2014 | Jovicic et al. | |
| 2015/0234033 A1 | 8/2015 | Jamieson et al. | |
| 2017/0117946 A1 | 4/2017 | Lee et al. | |
| 2018/0128892 A1 | 5/2018 | Granato | |
| 2019/0212411 A1 | 7/2019 | Kang | |
| 2020/0003885 A1 | 1/2020 | Choi | |
| 2020/0191943 A1* | 6/2020 | Wu | G01S 13/726 |

OTHER PUBLICATIONS

Extended European Search Report dated Jul. 19, 2023 regarding Application No. 21849179.3, 10 pages.

* cited by examiner

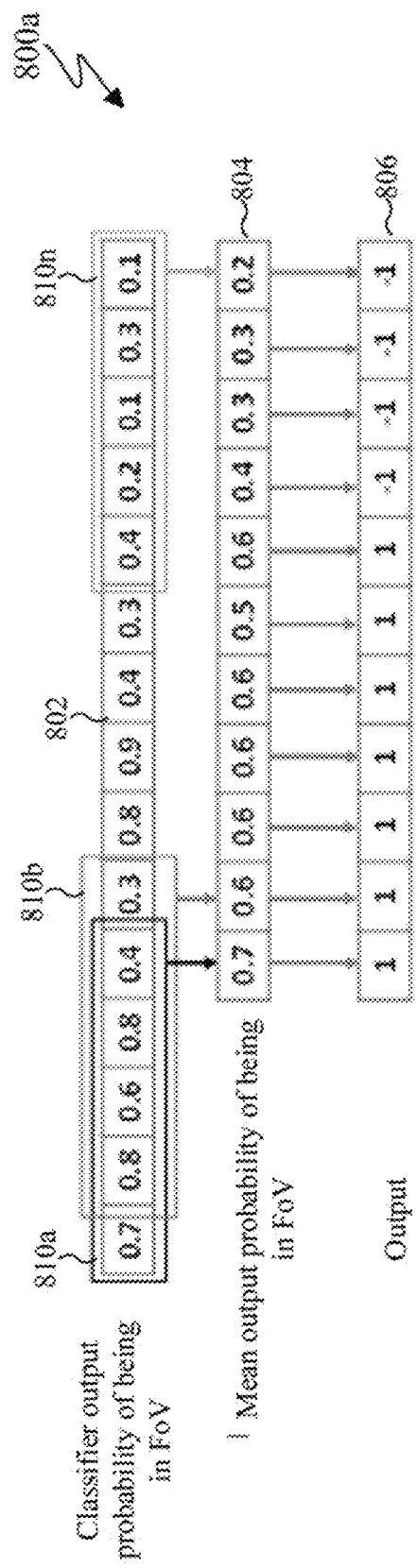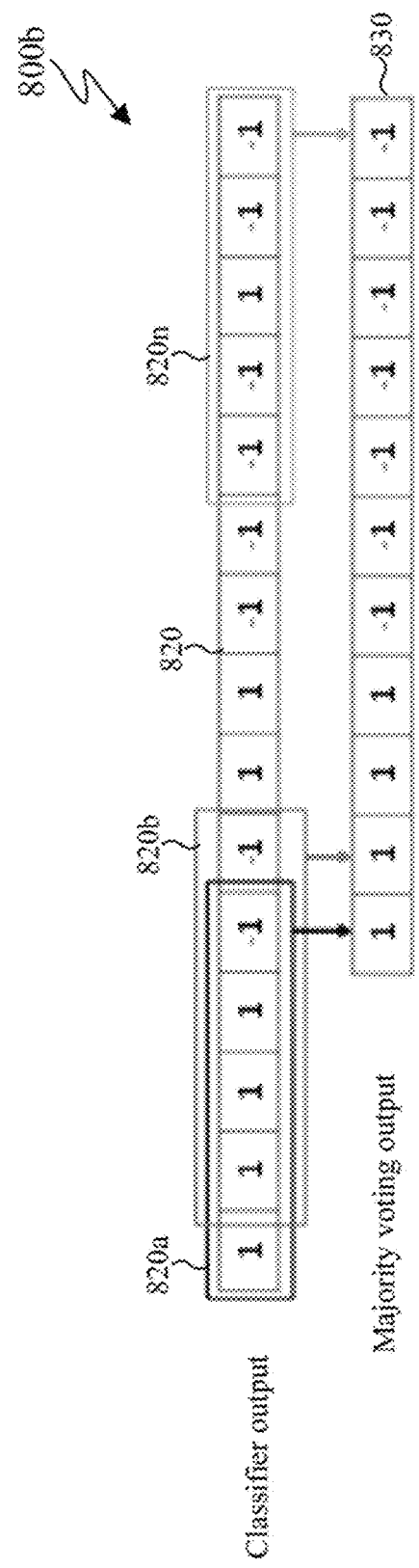
FIG. 8A
FIG. 8B

ANGLE OF ARRIVAL CAPABILITY IN ELECTRONIC DEVICES

CROSS-REFERENCE TO RELATED APPLICATION AND CLAIM OF PRIORITY

This application claims priority under 35 U.S.C. § 119(e) to U.S. Provisional Patent Application No. 63/059,043 filed on Jul. 30, 2021. The above-identified provisional patent application is hereby incorporated by reference in its entirety.

TECHNICAL FIELD

This disclosure relates generally to localizing an electronic device. More specifically, this disclosure relates to angle of arrival capability in electronic devices.

BACKGROUND

The use of mobile computing technology has greatly expanded largely due to usability, convenience, computing power, and the like. One result of the recent technological development is that electronic devices are becoming more compact, while the number of functions and features that a given device can perform is increasing. Certain electronic devices can determine whether another device is within its field of view. For example, an electronic device can transmit and receive signals with other devices and determine an angle of arrival (AoA) of the received signals and a distance between the devices. The signals can be corrupted which can create inaccurate AoA and range determinations. Inaccurate AoA and range determinations, can cause the electronic device to incorrectly determine that another electronic device is within its field of view or outside its field of view.

SUMMARY

This disclosure provides angle of arrival capability in electronic devices.

In one embodiment, a method is provided. The method includes obtaining channel information, range information, and angle of arrival (AoA) information based on wireless signals communicated between an electronic device and an external electronic device. The method also includes generating an initial prediction of a presence of the external electronic device relative to a field of view (FoV) of the electronic device based on the channel information and at least one of the range information or the AoA information, wherein the initial prediction includes an indication of whether the external electronic device is within the FoV or outside the FoV of the electronic device. The method further includes performing, using a tracking filter, a smoothing operation on the range information and the AoA information. Additionally, the method includes determining that the external electronic device is within the FoV or outside the FoV of the electronic device based on the AoA information, the smoothed AoA information, and the initial prediction of the presence of the external electronic device relative to the FoV of the electronic device.

In another embodiment, an electronic device is provided. The electronic device includes a processor. The processor is configured to obtain channel information, range information, and AoA information based on wireless signals communicated between an electronic device and an external electronic device. The processor is also configured to generate an initial prediction of a presence of the external electronic device relative to a FoV of the electronic device based on the channel information and at least one of the range information or the AoA information, wherein the initial prediction includes an indication of whether the external electronic device is within the FoV or outside the FoV of the electronic device. The processor is further configured to perform, using a tracking filter, a smoothing operation on the range information and the AoA information. Additionally, the processor is configured to determine that the external electronic device is within the FoV or outside the FoV of the electronic device based on the AoA information, the smoothed AoA information, and the initial prediction of the presence of the external electronic device relative to the FoV of the electronic device.

In yet another embodiment a non-transitory computer readable medium containing instructions is provided. The instructions that when executed cause at least one processor to obtain channel information, range information, and AoA information based on wireless signals communicated between an electronic device and an external electronic device. The instructions that when executed also cause at least one processor to generate an initial prediction of a presence of the external electronic device relative to a field FoV of the electronic device based on the channel information and at least one of the range information or the AoA information, wherein the initial prediction includes an indication of whether the external electronic device is within the FoV or outside the FoV of the electronic device. The instructions that when executed further cause at least one processor to perform, using a tracking filter, a smoothing operation on the range information and the AoA information. Additionally, the instructions that when executed cause at least one processor to determine that the external electronic device is within the FoV or outside the FoV of the electronic device based on the AoA information, the smoothed AoA information, and the initial prediction of the presence of the external electronic device relative to the FoV of the electronic device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 8A and 8B illustrate example moving average filters for an initial FoV prediction according to embodiments of the present disclosure;

DETAILED DESCRIPTION

Figure 1:
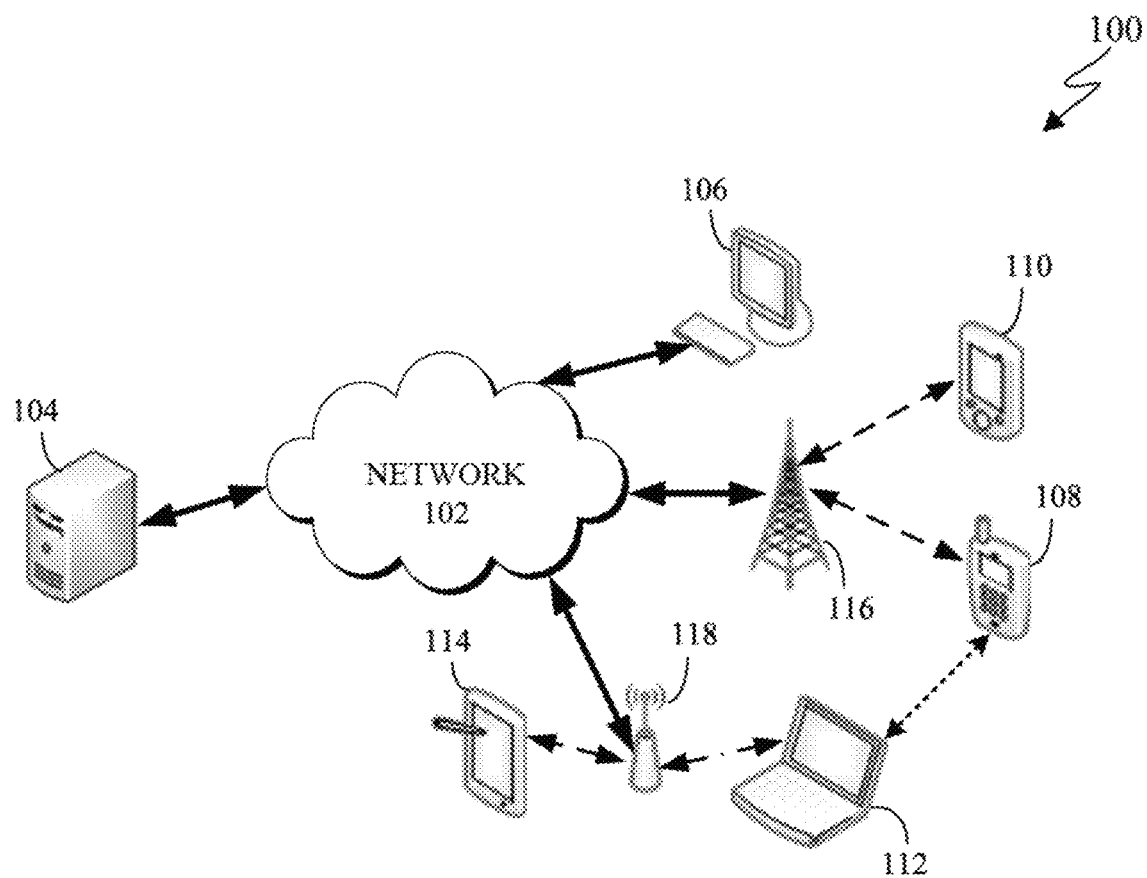
FIG. 1 illustrates an example communication system according to embodiments of this disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

An electronic device, according to embodiments of the present disclosure, can include a personal computer (such as a laptop, a desktop), a workstation, a server, a television, an appliance, and the like. In certain embodiments, an electronic device can be a portable electronic device such as a portable communication device (such as a smartphone or mobile phone), a laptop, a tablet, an electronic book reader (such as an e-reader), a personal digital assistants (PDAs), a portable multimedia player (PMP), an MP3 player, a mobile medical device, a virtual reality headset, a portable game console, a camera, and a wearable device, among others. Additionally, the electronic device can be at least one of a part of a piece of furniture or building/structure, an electronic board, an electronic signature receiving device, a projector, or a measurement device. The electronic device is one or a combination of the above-listed devices. Additionally, the electronic device as disclosed herein is not limited to the above-listed devices and can include new electronic devices depending on the development of technology. It is noted that as used herein, the term "user" may denote a human or another device (such as an artificial intelligent electronic device) using the electronic device.

In certain embodiments, an electronic device can include a receiver (or a transceiver) and one or more target devices can include a transmitter (or transceiver). The receiver (or transceiver) of the electronic device can be can ultra-wideband (UWB) receiver (or UWB transceiver). Similarly, the transmitter (or transceiver) target devices can be a UWB transmitter (or UWB transceiver). The electronic device can measure angle of arrival (AoA) of a UWB signal transmitted by the target device. UWB signals provide centimeter level ranging. For example, if the target device is within line of site (LOS) of the electronic device, the electronic device can determine the range (distance) between the two devices with an accuracy that is within ten centimeters. Alternatively if the target device is not within a LOS of the electronic device, the electronic device can determine the range between the two devices with an accuracy that is within fifty centimeters. Additionally, if the target device is within LOS of the electronic device, the electronic device can determine the AoA between the two devices with an accuracy that is within three degrees.

Embodiments of the present disclosure provide systems and methods to determine whether the target device is within the FoV of the electronic device. UWB measurements become negatively impacted due to the environment that the electronic device and the target device are within. Based on the environment, the location of the target device relative to the electronic device may be difficult to determine, such as when the electronic device is unable to be determine whether the received signals came directly from the target device or were a reflection off of an object in the environment.

Embodiments of the present disclosure recognize and take into consideration that without post processing an electronic device may be unable to determine whether a received signal came directly from a target device or if the signal was a reflection (referred to as a multipath effect). Accordingly, embodiments of the present disclosure provide systems and methods to improve the quality of the measurements for enabling an electronic device to determine whether the target device is within its the FoV of the electronic device. When the electronic device determines that the target device is within its FoV, can improve user experience with respect to sharing data such as in a peer-to-peer file sharing scenario.

Embodiments of the present disclosure provide systems and methods for post processing received signals. The received signals can include imperfect UWB measurements. The post processing can be used to identify whether the presence of a target device (such as an external electronic device) is within the FoV of an electronic device. Accordingly, embodiments of the present disclosure provide systems and methods for performing an initial prediction of whether a target device is within the FoV of the electronic device. The initial prediction can be based on received range information representing the distance between the target device and the electronic device. The initial prediction can also be based on the AoA of the received signals from the target device. The initial prediction can be further based on channel impulse response (CIR) features. Embodiments of the present disclosure also provide systems and methods for smoothing the range measurements and AoA measurements. Embodiments of the present disclosure further provide systems and methods for performing a final FoV classification. The final FoV classification is based on part on the initial prediction and the smoothed range measurements and the smoothed AoA measurements. The final FoV classification can output a FoV determination along with a confidence level of the determination. Additionally, embodiments of the present disclosure provide systems and methods for detecting a drastic or sudden motion of the electronic device. The motion can trigger the electronic device to a reset the state of the tracking filter. In certain embodiments, detecting a certain motion also triggers the electronic device to reset a buffer for storing the initial predictions, the final FoV classification, or both.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-114. The client devices 106-114 may be, for example, a smartphone, a tablet computer, a laptop, a personal computer, a wearable device, a head mounted display, or the like. The server 104 can represent one or more servers. Each server 104 includes any suitable computing or processing device that can provide computing services for one or more client devices, such as the client devices 106-114. Each server 104 could, for example, include one or more processing devices, one or more memories storing instructions and data, and one or more network interfaces facilitating communication over the network 102.

In certain embodiments, the server 104 is a neural network that is configured to extract features from the received signals. In certain embodiments, a neural network is included within any of the client devices 106-114. When a neural network is included in a client device, the client device can use the neural network to extract features from the received signals, without having to transmit content over the network 102. Similarly, when a neural network is included in a client device, the client device can use the neural network to identify whether another client device is within the field of view of the client deice that includes the neural network.

Each of the client devices 106-114 represent any suitable computing or processing device that interacts with at least one server (such as the server 104) or other computing device(s) over the network 102. The client devices 106-114 include a desktop computer 106, a mobile telephone or mobile device 108 (such as a smartphone), a PDA 110, a laptop computer 112, and a tablet computer 114. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. In certain embodiments, any of the client devices 106-114 can emit and collect radar signals via a measuring transceiver. In certain embodiments, any of the client devices 106-114 can emit and collect UWB signals via a measuring transceiver.

In this example, some client devices 108-114 communicate indirectly with the network 102. For example, the mobile device 108 and PDA 110 communicate via one or more base stations 116, such as cellular base stations or eNodeBs (eNBs). Also, the laptop computer 112 and the tablet computer 114 communicate via one or more wireless access points 118, such as IEEE 802.11 wireless access points. Note that these are for illustration only and that each of the client devices 106-114 could communicate directly with the network 102 or indirectly with the network 102 via any suitable intermediate device(s) or network(s). In certain embodiments, any of the client devices 106-114 transmit information securely and efficiently to another device, such as, for example, the server 104.

As illustrated, the laptop computer 112 can communicate with the mobile device 108. Based on the wireless signals which are communicated between these two devices, a device (such as the laptop computer 112, the mobile device 108, or another device, such as the server 104) obtaining channel information, range information, and AoA information. Channel information can include features of a channel impulse response (CIR) of a wireless channel between the laptop computer 112 and the mobile device 108. The range can be an instantaneous distance or variances in the distances between the laptop computer 112 and the mobile device 108, based on the wireless signals. Similarly, the AoA can be an instantaneous AoA measurement or variances in AoA measurements between the laptop computer 112 and the mobile device 108, based on the wireless signals.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
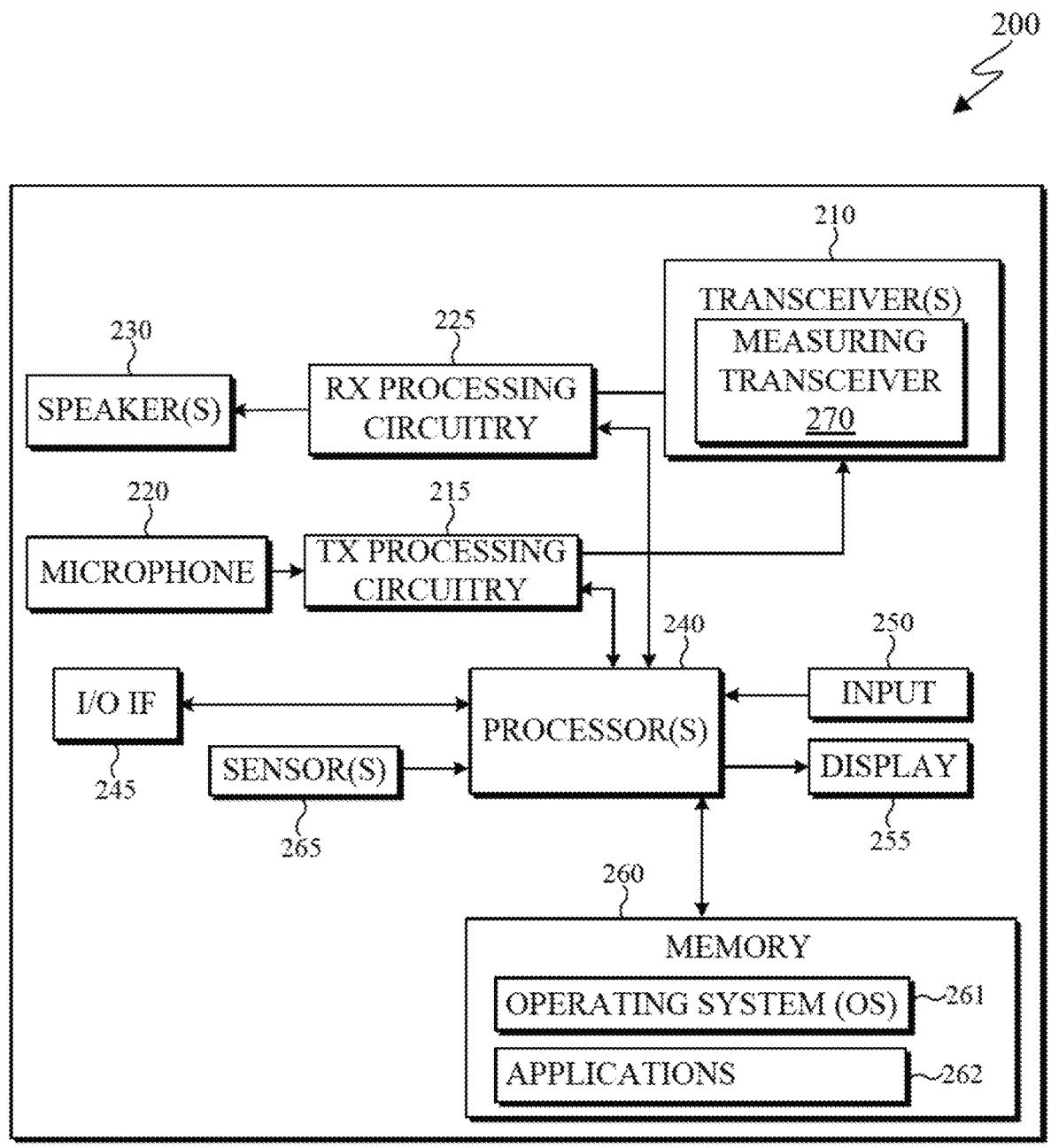
FIG. 2 illustrates an example electronic device according to embodiments of this disclosure.

FIG. 2 illustrates an example electronic device in accordance with an embodiment of this disclosure. In particular, FIG. 2 illustrates an example electronic device 200, and the electronic device 200 could represent the server 104 or one or more of the client devices 106-114 in FIG. 1. The electronic device 200 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, or the tablet computer 114 of FIG. 1), a robot, and the like.

As shown in FIG. 2, the electronic device 200 includes transceiver(s) 210, transmit (TX) processing circuitry 215, a microphone 220, and receive (RX) processing circuitry 225. The transceiver(s) 210 can include, for example, a RF transceiver, a BLUETOOTH transceiver, a WiFi transceiver, a ZIGBEE transceiver, an infrared transceiver, and various other wireless communication signals. The electronic device 200 also includes a speaker 230, a processor 240, an input/output (I/O) interface (IF) 245, an input 250, a display 255, a memory 260, and a sensor 265. The memory 260 includes an operating system (OS) 261, and one or more applications 262.

The transceiver(s) 210 can include an antenna array including numerous antennas. The antennas of the antenna array can include a radiating element composed of a conductive material or a conductive pattern formed in or on a substrate. The transceiver(s) 210 transmit and receive a signal or power to or from the electronic device 200. The transceiver(s) 210 receives an incoming signal transmitted from an access point (such as a base station, WiFi router, or BLUETOOTH device) or other device of the network 102 (such as a WiFi, BLUETOOTH, cellular, 5G, LTE, LTE-A, WiMAX, or any other type of wireless network). The transceiver(s) 210 down-converts the incoming RF signal to generate an intermediate frequency or baseband signal. The intermediate frequency or baseband signal is sent to the RX processing circuitry 225 that generates a processed baseband signal by filtering, decoding, and/or digitizing the baseband or intermediate frequency signal. The RX processing circuitry 225 transmits the processed baseband signal to the speaker 230 (such as for voice data) or to the processor 240 for further processing (such as for web browsing data).

The TX processing circuitry 215 receives analog or digital voice data from the microphone 220 or other outgoing baseband data from the processor 240. The outgoing baseband data can include web data, e-mail, or interactive video game data. The TX processing circuitry 215 encodes, multiplexes, and/or digitizes the outgoing baseband data to generate a processed baseband or intermediate frequency signal. The transceiver(s) 210 receives the outgoing processed baseband or intermediate frequency signal from the TX processing circuitry 215 and up-converts the baseband or intermediate frequency signal to a signal that is transmitted.

The processor 240 can include one or more processors or other processing devices. The processor 240 can execute instructions that are stored in the memory 260, such as the OS 261 in order to control the overall operation of the electronic device 200. For example, the processor 240 could control the reception of forward channel signals and the transmission of reverse channel signals by the transceiver(s) 210, the RX processing circuitry 225, and the TX processing circuitry 215 in accordance with well-known principles. The processor 240 can include any suitable number(s) and type(s) of processors or other devices in any suitable arrangement. For example, in certain embodiments, the processor 240 includes at least one microprocessor or microcontroller. Example types of processor 240 include microprocessors, microcontrollers, digital signal processors, field programmable gate arrays, application specific integrated circuits, and discrete circuitry. In certain embodiments, the processor 240 includes a neural network.

The processor 240 is also capable of executing other processes and programs resident in the memory 260, such as operations that receive and store data. The processor 240 can move data into or out of the memory 260 as required by an executing process. In certain embodiments, the processor 240 is configured to execute the one or more applications 262 based on the OS 261 or in response to signals received from external source(s) or an operator. Example, applications 262 can include a multimedia player (such as a music player or a video player), a phone calling application, a virtual personal assistant, and the like.

The processor 240 is also coupled to the I/O interface 245 that provides the electronic device 200 with the ability to connect to other devices, such as client devices 106-114. The I/O interface 245 is the communication path between these accessories and the processor 240.

The processor 240 is also coupled to the input 250 and the display 255. The operator of the electronic device 200 can use the input 250 to enter data or inputs into the electronic device 200. The input 250 can be a keyboard, touchscreen, mouse, track ball, voice input, or other device capable of acting as a user interface to allow a user in interact with the electronic device 200. For example, the input 250 can include voice recognition processing, thereby allowing a user to input a voice command. In another example, the input 250 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 250 can be associated with the sensor(s) 265, the measuring transceiver 270, a camera, and the like, which provide additional inputs to the processor 240. The input 250 can also include a control circuit. In the capacitive scheme, the input 250 can recognize touch or proximity.

The display 255 can be a liquid crystal display (LCD), light-emitting diode (LED) display, organic LED (OLED), active matrix OLED (AMOLED), or other display capable of rendering text and/or graphics, such as from websites, videos, games, images, and the like. The display 255 can be a singular display screen or multiple display screens capable of creating a stereoscopic display. In certain embodiments, the display 255 is a heads-up display (HUD).

The memory 260 is coupled to the processor 240. Part of the memory 260 could include a RAM, and another part of the memory 260 could include a Flash memory or other ROM. The memory 260 can include persistent storage (not shown) that represents any structure(s) capable of storing and facilitating retrieval of information (such as data, program code, and/or other suitable information). The memory 260 can contain one or more components or devices supporting longer-term storage of data, such as a read only memory, hard drive, Flash memory, or optical disc.

The electronic device 200 further includes one or more sensors 265 that can meter a physical quantity or detect an activation state of the electronic device 200 and convert metered or detected information into an electrical signal. For example, the sensor 265 can include one or more buttons for touch input, a camera, a gesture sensor, optical sensors, cameras, one or more inertial measurement units (IMUs), such as a gyroscope or gyro sensor, and an accelerometer. The sensor 265 can also include an air pressure sensor, a magnetic sensor or magnetometer, a grip sensor, a proximity sensor, an ambient light sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 265 can further include control circuits for controlling any of the sensors included therein. Any of these sensor(s) 265 may be located within the electronic device 200 or within a secondary device operably connected to the electronic device 200.

In this embodiment, one of the one or more transceivers in the transceiver 210 is the measuring transceiver 270. The measuring transceiver 270 is configured to transmit and receive signals for detecting and ranging purposes. The measuring transceiver 270 can transmit and receive signals for measuring range and angle of an external object relative to the electronic device 200. The measuring transceiver 270 may be any type of transceiver including, but not limited to a WiFi transceiver, for example, an 802.11ay transceiver, a UWB transceiver, and the like. In certain embodiments, the measuring transceiver 270 includes a sensor. For example, the measuring transceiver 270 can operate both measuring and communication signals concurrently. The measuring transceiver 270 includes one or more antenna arrays, or antenna pairs, that each includes a transmitter (or transmitter antenna) and a receiver (or receiver antenna). The measuring transceiver 270 can transmit signals at various frequencies, such as in UWB. The measuring transceiver 270 can receive the signals from an external electronic device also referred to as a target device) for determining whether the external electronic device within the FoV of the electronic device 200.

The transmitter, of the measuring transceiver 270, can transmit UWB signals. The receiver, of the measuring transceiver, can receive UWB signals from other electronic devices. The processor 240 can analyze the time difference, based on the time stamps of transmitted and received signals, to measure the distance of the target objects from the electronic device 200. Based on the time differences, the processor 240 can generate location information, indicating a distance that the external electronic device is from the electronic device 200. In certain embodiments, the measuring transceiver 270 is a sensor that can detect range and AoA of another electronic device. For example, the measuring transceiver 270 can identify changes in azimuth and/or elevation of the other electronic device relative to the measuring transceiver 270. In certain embodiments, the measuring transceiver 270 represents two or more transceivers. Based on the differences between a signal received by each of the transceivers, the processor 240 can determine the identify changes in azimuth and/or elevation corresponding to the AoA of the received signals.

Although FIG. 2 illustrates one example of electronic device 200, various changes can be made to FIG. 2. For example, various components in FIG. 2 can be combined, further subdivided, or omitted and additional components can be added according to particular needs. As a particular example, the processor 240 can be divided into multiple processors, such as one or more central processing units (CPUs), one or more graphics processing units (GPUs), one or more neural networks, and the like. Also, while FIG. 2 illustrates the electronic device 200 configured as a mobile telephone, tablet, or smartphone, the electronic device 200 can be configured to operate as other types of mobile or stationary devices.

Figure 3:
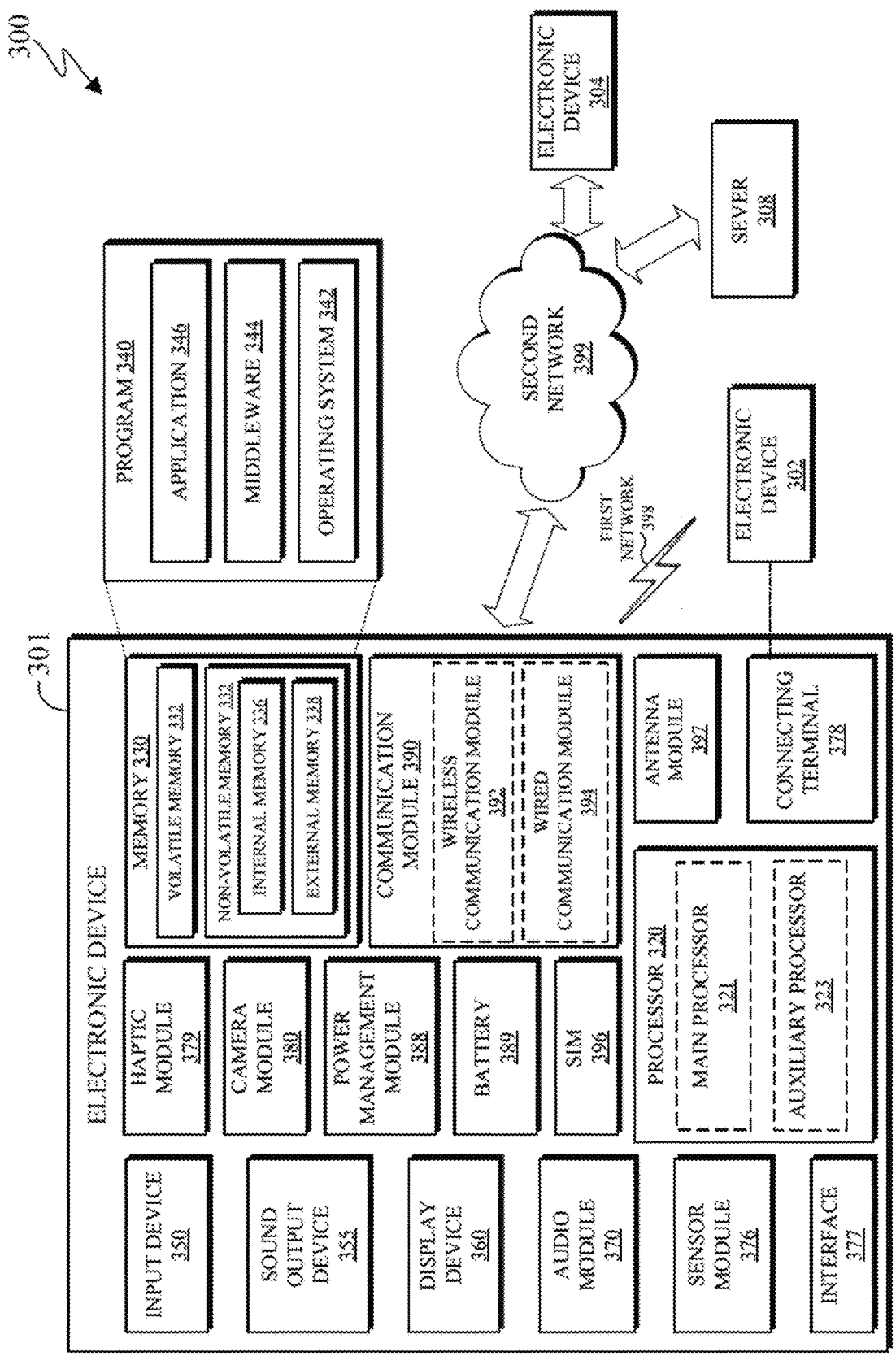
FIG. 3 illustrates an example network configuration according to embodiments of the present disclosure.

FIG. 3 illustrates an example network configuration according to embodiments of the present disclosure. An embodiment of the network configuration shown in FIG. 3 is for illustration only. One or more of the components illustrated in FIG. 3 can be implemented in specialized circuitry configured to perform the noted functions or one or more of the components can be implemented by one or more processors executing instructions to perform the noted functions.

FIG. 3 illustrated a block diagram illustrating a network configuration including an electronic device 301 in a network environment 300 according to various embodiments. As illustrated in FIG. 300, the electronic device 301 in the network environment 300 may communicate with an electronic device 302 via a first network 398 (e.g., a short-range wireless communication network), or an electronic device 304 or a server 308 via a second network 399 (e.g., a long-range wireless communication network). The first network 398 and/or the second network 399 can be similar to the network 102 of FIG. 1. The electronic devices 301, 302, and 304 can be similar to any of the client devices 106-114 of FIG. 1 and include similar components to that of the electronic device 200 of FIG. 2. The server 308 can be similar to the server 104 of FIG. 1.

The electronic device 301 can be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

According to an embodiment, the electronic device 301 may communicate with the electronic device 304 via the server 308. According to an embodiment, the electronic device 301 may include a processor 320, memory 330, an input device 350, a sound output device 355, a display device 360, an audio module 370, a sensor module 376, an interface 377, a haptic module 379, a camera module 380, a power management module 388, a battery 389, a communication module 390, a subscriber identification module (SIM) 396, or an antenna module 397. In some embodiments, at least one (e.g., the display device 360 or the camera module 380) of the components may be omitted from the electronic device 301, or one or more other components may be added in the electronic device 301. In some embodiments, some of the components may be implemented as single integrated circuitry. For example, the sensor module 376 (e.g., a fingerprint sensor, an iris sensor, or an illuminance sensor) may be implemented as embedded in the display device 360 (e.g., a display).

The processor 320 may execute, for example, software (e.g., a program 340) to control at least one other component (e.g., a hardware or software component) of the electronic device 301 coupled with the processor 320 and may perform various data processing or computation. According to one embodiment, as at least part of the data processing or computation, the processor 320 may load a command or data received from another component (e.g., the sensor module 376 or the communication module 390) in volatile memory 332, process the command or the data stored in the volatile memory 332, and store resulting data in non-volatile memory 334.

According to an embodiment, the processor 320 may include a main processor 321 (e.g., a central processing unit (CPU) or an application processor (AP)), and an auxiliary processor 323 (e.g., a graphics processing unit (GPU), an image signal processor (ISP), a sensor hub processor, or a communication processor (CP)) that is operable independently from, or in conjunction with, the main processor 321. Additionally or alternatively, the auxiliary processor 323 may be adapted to consume less power than the main processor 321, or to be specific to a specified function. The auxiliary processor 323 may be implemented as separate from, or as part of the main processor 321.

The auxiliary processor 323 may control at least some of functions or states related to at least one component (e.g., the display device 360, the sensor module 376, or the communication module 390) among the components of the electronic device 301, instead of the main processor 321 while the main processor 321 is in an inactive (e.g., sleep) state, or together with the main processor 321 while the main processor 321 is in an active state (e.g., executing an application). According to an embodiment, the auxiliary processor 323 (e.g., an image signal processor or a communication processor) may be implemented as part of another component (e.g., the camera module 380 or the communication module 390) functionally related to the auxiliary processor 323.

The memory 330 may store various data used by at least one component (e.g., the processor 320 or the sensor module 376) of the electronic device 301. The various data may include, for example, software (e.g., the program 340) and input data or output data for a command related thereto. The memory 330 may include the volatile memory 332 or the non-volatile memory 334.

The program 340 may be stored in the memory 330 as software. The program 340 may include, for example, an operating system (OS) 342, middleware 344, or an application 346.

The input device 350 may receive a command or data to be used by other components (e.g., the processor 320) of the electronic device 301, from the outside (e.g., a user) of the electronic device 301. The input device 350 may include, for example, a microphone, a mouse, a keyboard, or a digital pen (e.g., a stylus pen). In certain embodiments, the input device 350 includes a sensor for gesture recognition. For example, the input device 350 can include a transceiver similar to the measuring transceiver 270 of FIG. 2.

The sound output device 355 may output sound signals to the outside of the electronic device 301. The sound output device 355 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 360 may visually provide information to the outside (e.g., a user) of the electronic device 301. The display device 360 may include, for example, a display, a hologram device, or a projector and control circuitry to control a corresponding one of the display, hologram device, or projector. According to an embodiment, the display device 360 may include touch circuitry adapted to detect a touch, or sensor circuitry (e.g., a pressure sensor) adapted to measure the intensity of force incurred by the touch. The display device 360 can be similar to the display 255 of FIG. 2.

The audio module 370 may convert a sound into an electrical signal and vice versa. According to an embodiment, the audio module 370 may obtain the sound via the input device 350, output the sound via the sound output device 355, or output the sound via a headphone of an external electronic device (e.g., an electronic device 302) directly (e.g., wiredly) or wirelessly coupled with the electronic device 301.

The sensor module 376 may detect an operational state (e.g., power or temperature) of the electronic device 301 or an environmental state (e.g., a state of a user) external to the electronic device 301, and then generate an electrical signal or data value corresponding to the detected state. According to an embodiment, the sensor module 376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor. The sensor module 376 can be similar to the sensors 265 of FIG. 2.

The interface 377 may support one or more specified protocols to be used for the electronic device 101 to be coupled with the external electronic device (e.g., the electronic device 302) directly (e.g., wiredly) or wirelessly. According to an embodiment, the interface 377 may include, for example, a high definition multimedia interface (HDMI), a universal serial bus (USB) interface, a secure digital (SD) card interface, or an audio interface.

A connecting terminal 378 may include a connector via which the electronic device 301 may be physically connected with the external electronic device (e.g., the electronic device 302). According to an embodiment, the connecting terminal 378 may include, for example, a HDMI connector, a USB connector, a SD card connector, or an audio connector (e.g., a headphone connector).

The haptic module 379 may convert an electrical signal into a mechanical stimulus (e.g., a vibration or a movement) or electrical stimulus which may be recognized by a user via his tactile sensation or kinesthetic sensation. According to an embodiment, the haptic module 379 may include, for example, a motor, a piezoelectric element, or an electric stimulator.

The camera module 380 may capture a still image or moving images. According to an embodiment, the camera module 380 may include one or more lenses, image sensors, image signal processors, or flashes.

The power management module 388 may manage power supplied to the electronic device 301. According to one embodiment, the power management module 388 may be implemented as at least part of, for example, a power management integrated circuit (PMIC).

The battery 389 may supply power to at least one component of the electronic device 301. According to an embodiment, the battery 389 may include, for example, a primary cell which is not rechargeable, a secondary cell which is rechargeable, or a fuel cell.

The communication module 390 may support establishing a direct (e.g., wired) communication channel or a wireless communication channel between the electronic device 301 and the external electronic device (e.g., the electronic device 302, the electronic device 304, or the server 308) and performing communication via the established communication channel. The communication module 390 may include one or more communication processors that are operable independently from the processor 320 (e.g., the application processor (AP)) and supports a direct (e.g., wired) communication or a wireless communication.

According to an embodiment, the communication module 390 may include a wireless communication module 392 (e.g., a cellular communication module, a short-range wireless communication module, or a global navigation satellite system (GNSS) communication module) or a wired communication module 394 (e.g., a local area network (LAN) communication module or a power line communication (PLC) module). A corresponding one of these communication modules may communicate with the external electronic device via the first network 398 (e.g., a short-range communication network, such as BLUETOOTH, wireless-fidelity (Wi-Fi) direct, UWB, or infrared data association (IrDA)) or the second network 399 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 392 may identify and authenticate the electronic device 301 in a communication network, such as the first network 398 or the second network 399, using subscriber information (e.g., international mobile subscriber identity (IMSI)) stored in the subscriber identification module 396.

The antenna module 397 may transmit or receive a signal or power to or from the outside (e.g., the external electronic device) of the electronic device 301. According to an embodiment, the antenna module 397 may include an antenna including a radiating element composed of a conductive material or a conductive pattern formed in or on a substrate (e.g., PCB).

According to an embodiment, the antenna module 397 may include a plurality of antennas. In such a case, at least one antenna appropriate for a communication scheme used in the communication network, such as the first network 398 or the second network 399, may be selected, for example, by the communication module 390 (e.g., the wireless communication module 392) from the plurality of antennas. The signal or the power may then be transmitted or received between the communication module 390 and the external electronic device via the selected at least one antenna.

According to an embodiment, another component (e.g., a radio frequency integrated circuit (RFIC)) other than the radiating element may be additionally formed as part of the antenna module 397.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 301 and the external electronic device 304 via the server 308 coupled with the second network 399. Each of the electronic devices 302 and 304 may be a device of a same type as, or a different type, from the electronic device 301. According to an embodiment, all or some of operations to be executed at the electronic device 301 may be executed at one or more of the external electronic devices 302, 304, or 308. For example, if the electronic device 301 may perform a function or a service automatically, or in response to a request from a user or another device, the electronic device 301, instead of, or in addition to, executing the function or the service, may request the one or more external electronic devices to perform at least part of the function or the service.

The one or more external electronic devices receiving the request may perform the at least part of the function or the service requested, or an additional function or an additional service related to the request and transfer an outcome of the performing to the electronic device 301. The electronic device 301 may provide the outcome, with or without further processing of the outcome, as at least part of a reply to the request. To that end, a cloud computing, distributed computing, or client-server computing technology may be used, for example.

Although FIG. 3 illustrates one example of the electronic device 301 in the network environment 300, various changes can be made to FIG. 3. For example, various components in FIG. 3 can be combined, further subdivided, or omitted and additional components can be added according to particular needs. As a particular example, the processor 320 can be further divided into additional processors, such as one or more central processing units (CPUs), one or more graphics processing units (GPUs), one or more neural networks, and the like. Also, while FIG. 3 illustrates the electronic device 301 configured as a mobile telephone, tablet, or smartphone, the electronic device 301 can be configured to operate as other types of mobile or stationary devices.

Figure 4A:
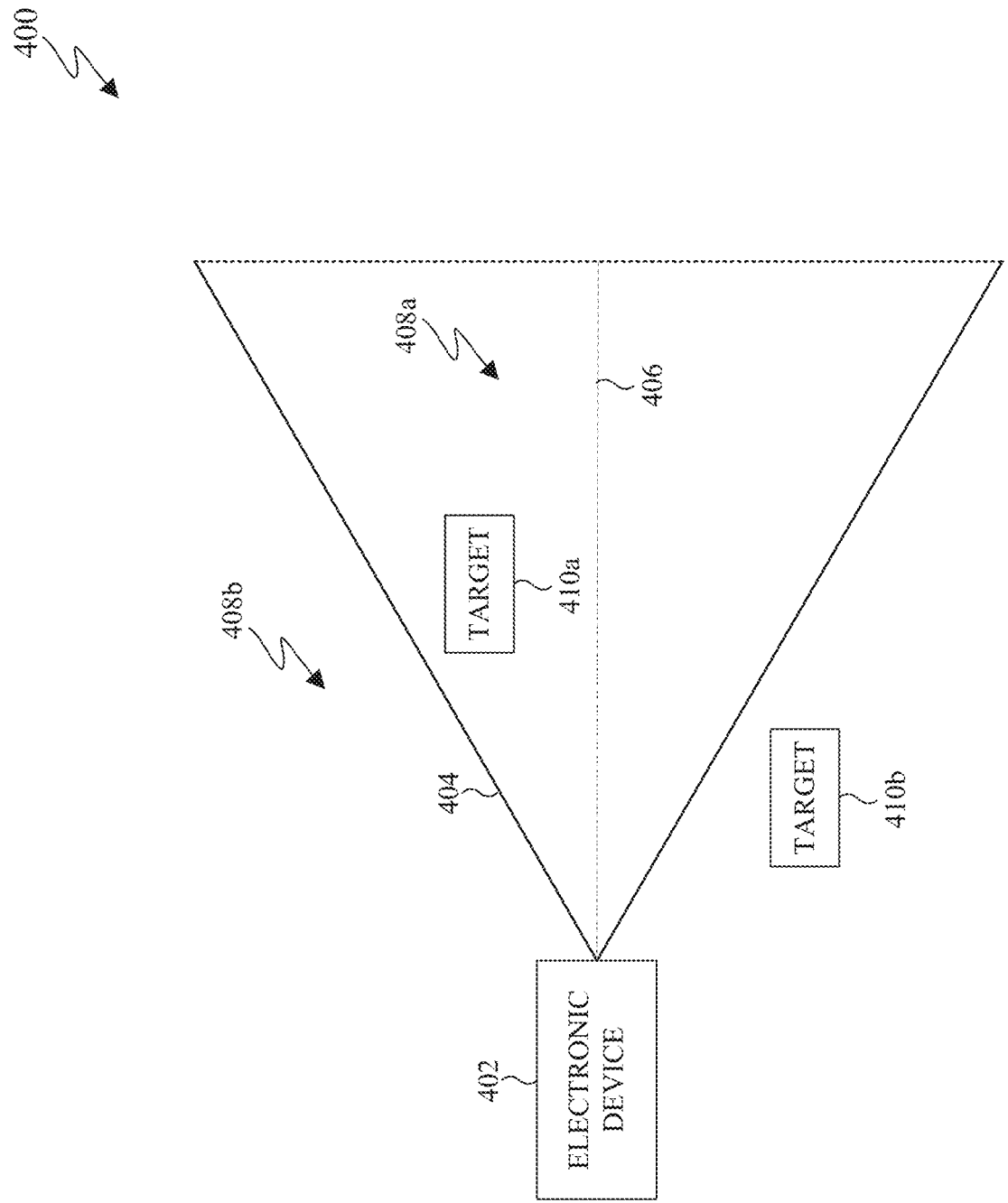
FIG. 4A illustrates an example diagram of a determination of whether target device is within a field of view (FoV) of an electronic device according to embodiments of the present disclosure.
Figure 4B:
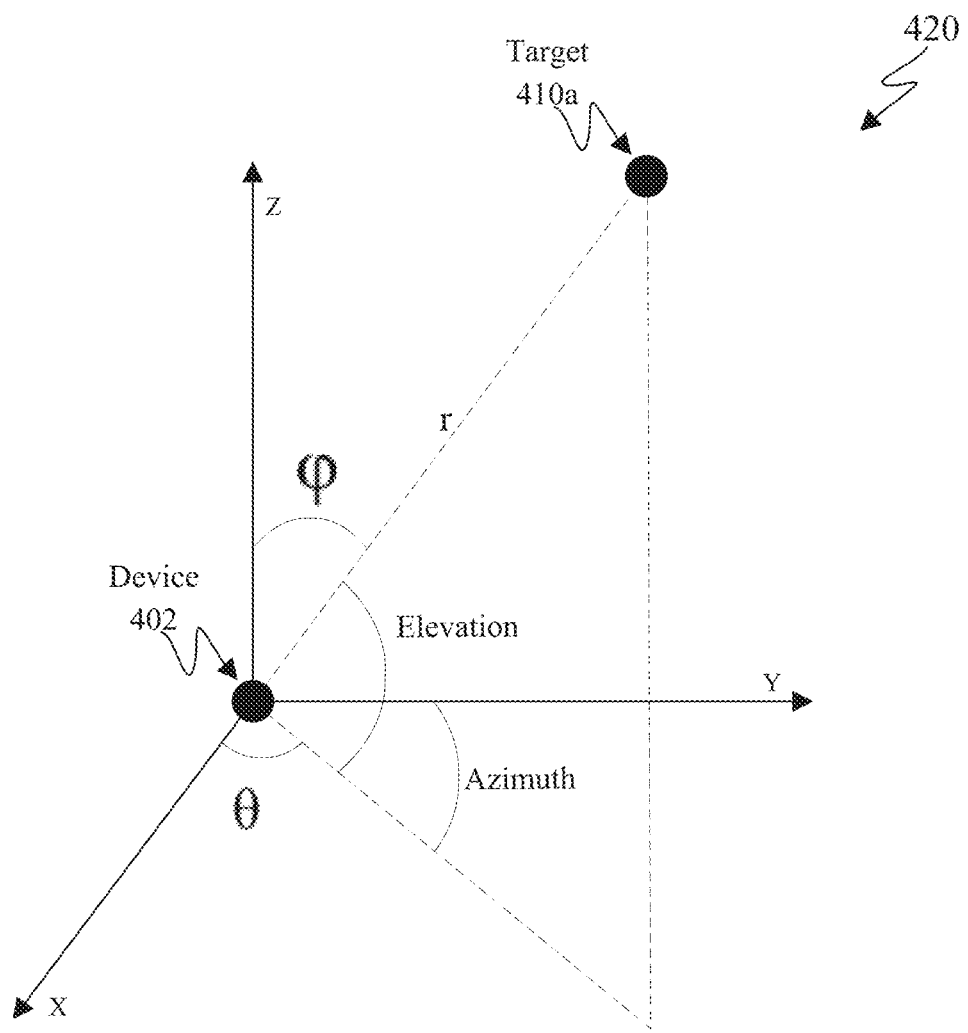
FIG. 4B illustrates an example coordinate system according to embodiments of the present disclosure.

FIG. 4A illustrates an example diagram 400 of a determination of whether a target device (such as the target device 410a or the target device 410b) is within a FoV of an electronic device 402 according to embodiments of the present disclosure. FIG. 4B illustrates an example coordinate system 420 according to embodiments of the present disclosure. The electronic device 402, the target device 410a, and the target device 410b can be any one of the client device 106-114 and can include internal components similar to that of electronic device 200 of FIG. 2 and the electronic device 301 of FIG. 3. The determination of whether the target device 410a or the target device 410b is within the field of view of the electronic device 402 can be performed by the electronic device 402, any one of the client device 106-114 or the server 104 of FIG. 1.

In certain embodiments, the electronic device 402, the target device 410a, and the target device 410b can include a transceiver, such as a UWB transceiver. Any other suitable transceiver, receiver, or transmitter may be used. Range and AoA information is obtained based on the exchange of signals between the electronic device 402, the target device 410a, and the target device 410b.

As shown in FIG. 4A, the determination of whether an external electronic device (such as either of the target devices 410a or 410b) is within a FoV of another electronic device (such as the electronic device 402) is based on the size and shape of a FoV. A portion of the environment around the electronic device 402 is illustrated as FoV 408a, while another portion of the environment around the electronic device 402 is illustrated as outside FoV 408b. The boundary 404 represents an approximate boundary between the FoV 408a and outside the FoV 408b. The boresight 406 is the center of the FoV 408a. The boresight 406 can be the axis of maximum gain (e.g., maximum radiated power) of an antenna (e.g., a directional antenna) of the electronic device 402. In some instances, the axis of maximum gain coincides with the axis of symmetry of the antenna of the electronic device 402. In some implementations, the electronic device 402 includes one or more phased array antennas that can electronically steer a beam, change the angle of the boresight 406 by shifting the relative phase of the radio waves emitted by different antenna elements, radiate beams in multiple directions, and the like.

The FoV of an electronic device (such as the FoV 408a of the electronic device 402 of FIG. 4A) is a range of angles (e.g., around the boresight 406), within which the target device (such as the target devices 410a and 410b) can be defined as being present (e.g., based on UWB measurements). The size and shape of a FoV can vary based on environmental conditions and the hardware of the electronic device itself.

In certain embodiments, if there is a direct line of sight (LOS) between the electronic device 402 and a target device (such as the target device 410a or 410b), and range and AoA measurements are good, identifying the presence of target in FoV can be performed based on AoA measurements. However, many times, the measurements are corrupted by multipath and non-line of sight (NLOS) scenarios. Non-isotropic antenna radiation patterns can also result in low quality of AoA measurements. For example, when the signal received from a direct path between the target device (such as the target device 410b) is weak, it is possible that the signal received from a reflected path, based on the environment, can be strong enough to be used for generating the range and AoA measurements. The generated range and AoA measurements which are based on a reflected signal would give false results of where the target is. For example, the target device 410b can transmit signals to the electronic device 402. If the electronic device 402 uses a reflected signal (instead of a direct signal) the electronic device 402 can incorrectly determine that the target device 410b is located within the FoV 408a instead of its actual location which is outside the FoV 408b. Therefore, embodiments of the present disclosure address problems for determining whether the target device is in the FoV of the electronic device when the UWB measurements between them may not be very accurate.

As shown in FIG. 4B, the coordinate system 420 can be used to find the distance and the relative angle that the target device 410a is from the electronic device 402. The distance and the relative angle between the target device 410a and the electronic device 402 correspond to the range and AoA measurements when the target device 410a is within the FoV of the electronic device 402. The coordinate system 420 illustrates the azimuth angle and the elevation angle between the two devices. As illustrated, the azimuth angle is the horizontal angle between the electronic device 402 and the target device 410a. Similarly, the elevation angle is the vertical angle between the electronic device 402 and the target device 410a. The coordinate system 420 illustrates the range, r, (distance) between the electronic device 402 and the target device 410a.

Figure 5A:
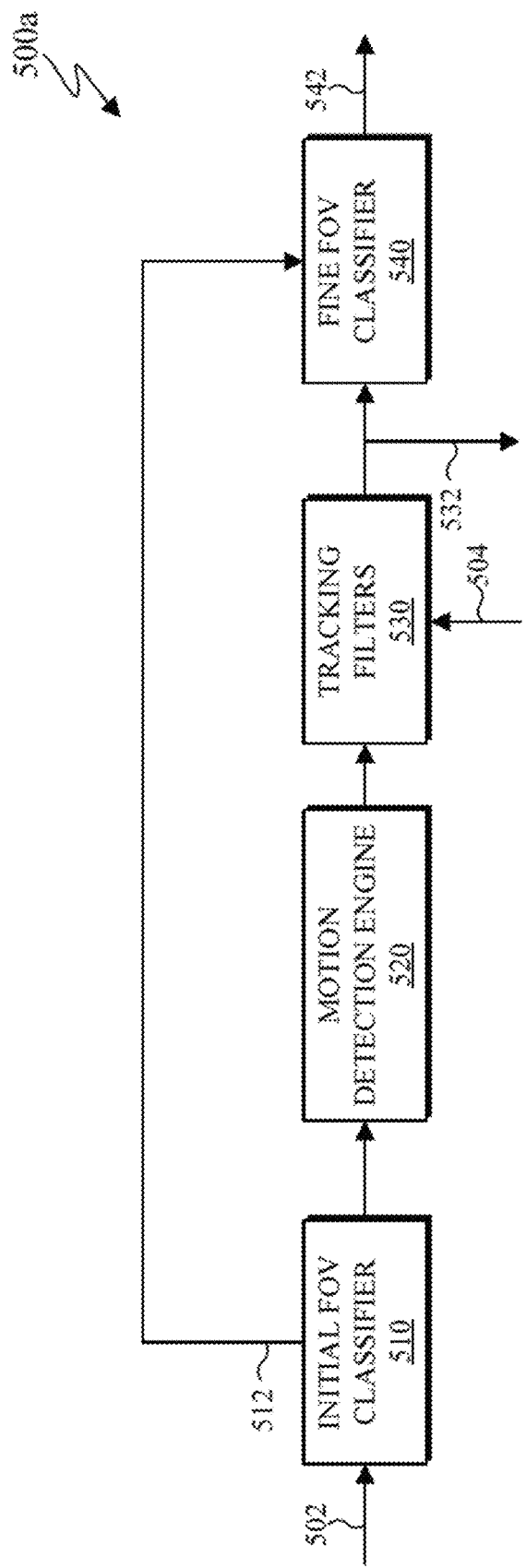
FIGS. 5A, 5B, and 5C illustrate signal processing diagrams for field of view determination according to embodiments of the present disclosure.
Figure 5B:
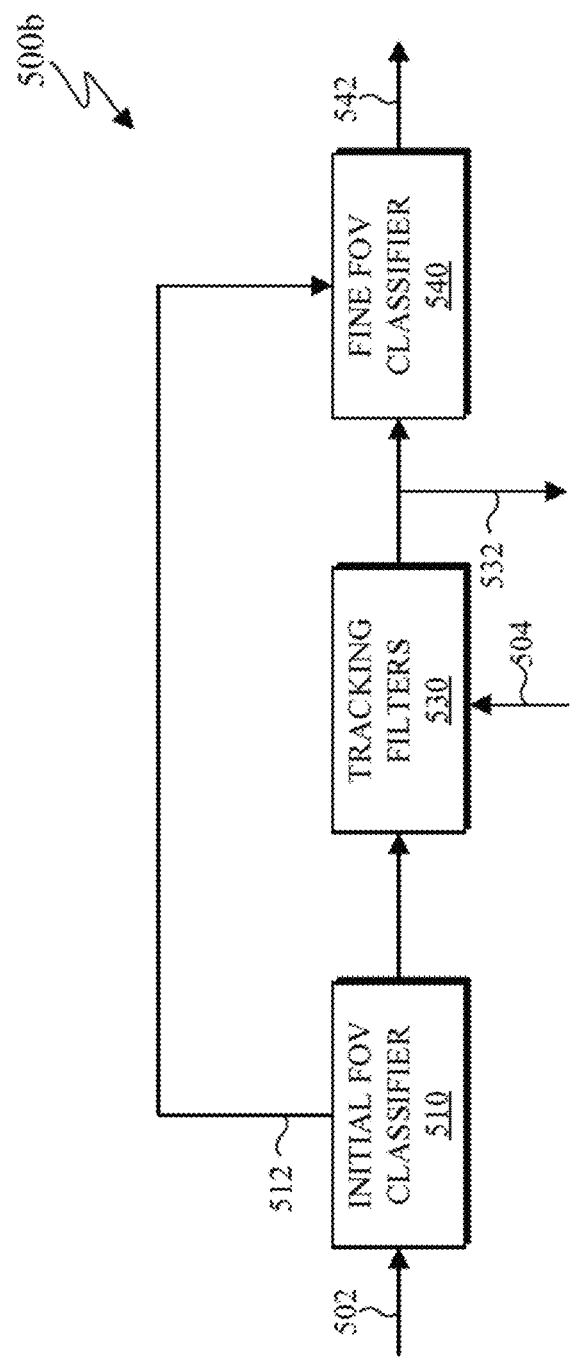
Figure 5C:
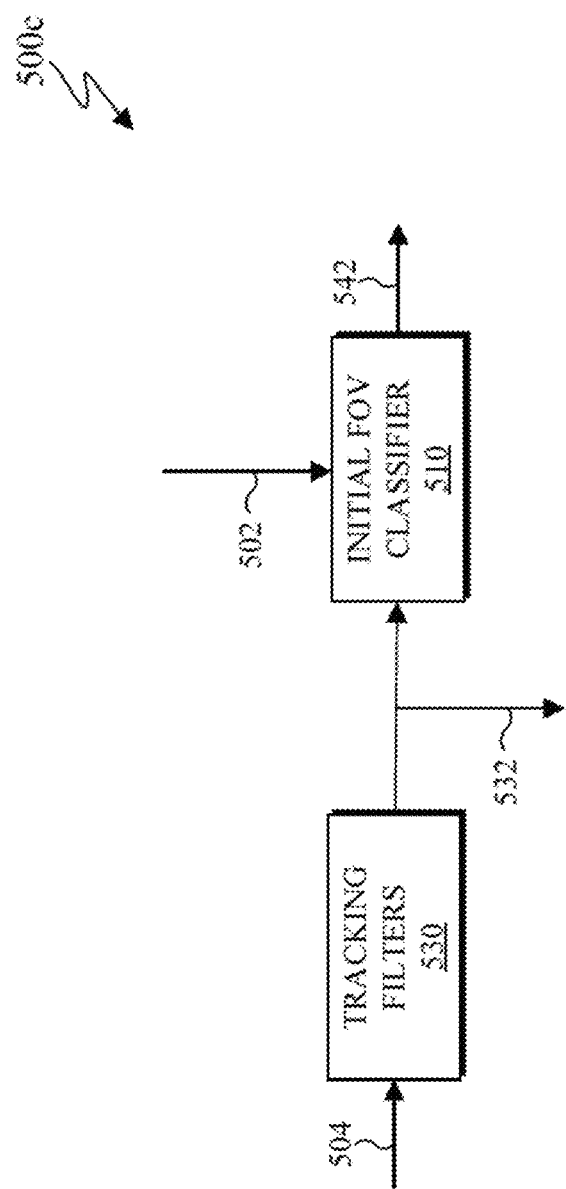

FIGS. 5A, 5B, and 5C illustrate signal processing diagrams 500a, 500b, and 500c, respectively, for field of view determination according to embodiments of the present disclosure. In certain embodiments, the signal processing diagrams 500a, 500b, and 500c can be performed by any one of the client device 106-114 or the server 104 of FIG. 1 and can include internal components similar to that of electronic device 200 of FIG. 2 and the electronic device 301 of FIG. 3.

As discussed above, post processing can be performed to improve the quality of measurements received from transceivers and output a FoV decision regarding the target device along with smoothed range and AoA. FIGS. 5A, 5B, and 5C describe various signal processing diagrams for improving the quality of measurements received from transceivers and determining whether a target device is within the FoV of the electronic device.

As illustrated in FIG. 5A, the signal processing diagram 500a includes initial FoV classifier 510, a motion detection engine 520, a tracking filter operation 530, and a fine FoV classifier 540. In certain embodiments, if a motion sensor is not available (such as when the electronic device 200 does not include a sensor 265), then the motion detection engine 520 can be removed such as illustrated by the signal processing diagram 500b of FIG. 5B and the signal processing diagram 500c of FIG. 5C.

The signal processing diagrams 500a, 500b, and 500c receive input 502 and input 504. The input 502 includes features (such as UWB features) based on the received signals that are communicated between the electric device and the target device. The input 504 includes measurements (such as range measurements and AoA measurements) based on the received signals that are communicated between the electric device and the target device.

Figure 6:
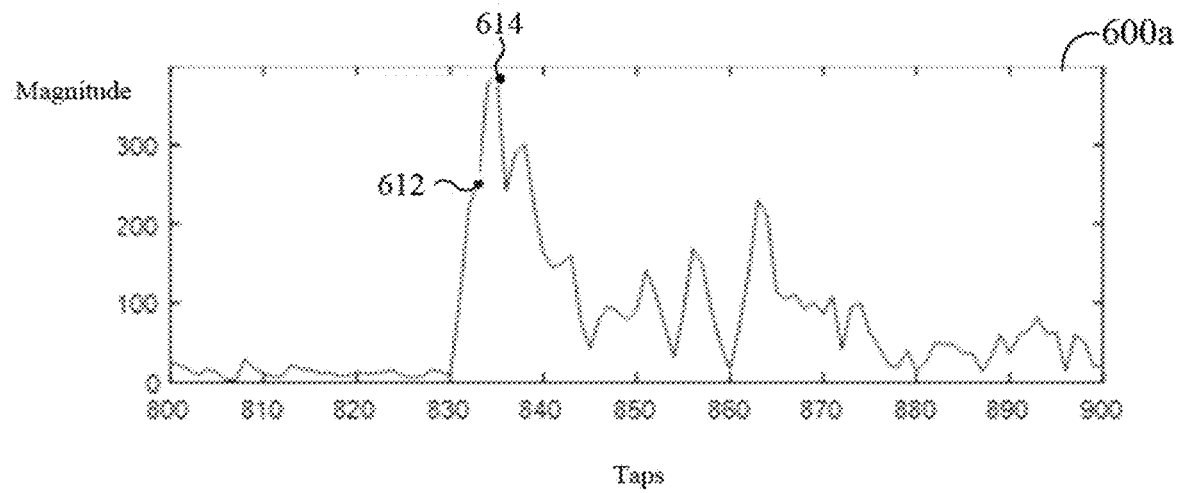
FIG. 6 illustrates example channel impulse response (CIR) graphs for an initial FoV determination according to embodiments of the present disclosure.
Figure 6:
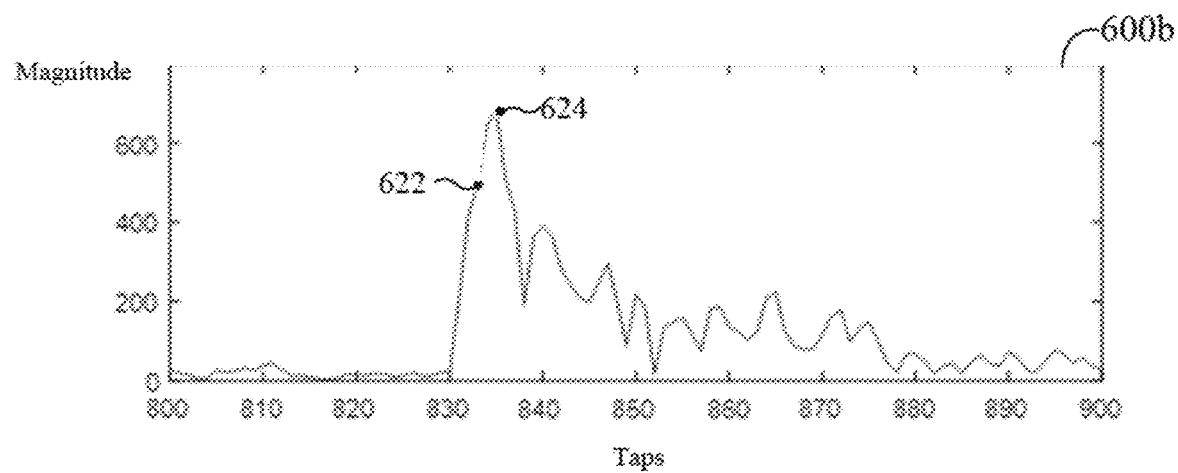

In certain embodiments, the features of the input 502 are derived from CIR. Example features can include, but are not limited to: signal-to-noise ratio (SNR) of the first peak (in dB, in linear domain or with other relative strength indicator) from the CIR, SNR of the strongest peak (in dB, in linear domain or with other relative strength indicator) from the CIR, difference between the SNR of strongest and first peak (in dB, in linear domain or with other relative strength indicator), received signal strength (in dB or dBm), and the time difference between the first and strongest peak (in nsec, number of time samples or other time based metrics). FIG. 6 illustrates CIR graphs depicting the first peak and the strongest peak.

For example, FIG. 6 illustrates example CIR graphs 600a and 600b for an initial FoV determination according to embodiments of the present disclosure. In certain embodiments, the CIR graphs 600a and 600b can be created by any one of the client device 106-114 or the server 104 of FIG. 1 and can include internal components similar to that of electronic device 200 of FIG. 2 and the electronic device 301 of FIG. 3.

The CIR graphs 600a and 600b of FIG. 6 represent CIR from two different antennae of the electronic device. For example, the CIR graph 600a represents the CIR from one antenna of an electronic device and the CIR graph 600b represents the CIR from another antenna of the same electronic device. The CIR graphs 600a and 600b show the signal power vs. tap index of a received signal. The range and AoA measurements can be calculated based on the earliest peak with sufficient SNR in the CIR plot.

The features derived from the CIR graphs 600a and 600b can be used to classify, via an initial prediction (via the initial FoV classifier 510) of whether target device is in a FoV of the electronic device. The CIR features of the input 502 can include (i) absolute strength of one or multiple peaks in CIR, normally represented by SNR, (ii) difference in signal strength among multiple peaks in CIR, normally represented by SNR, (iii) time differences between multiple peaks in the CIR, (iv) phase relationship among multiple antennas used to generate the AoA information, (v) other features derived from the amplitude and phase around the peaks, and the like.

In certain embodiments, various feature vectors can be included in the input 502. The initial FoV classifier 510 then uses the feature vectors from the input 502 for generating the initial prediction of whether the target device is within the FoV of the electronic device. For example, the feature vector of the input 502 could be expressed as:

$$\text{Feature Vector} = [\text{SNRFirst}, \text{SNRMain}, \text{AoA}] \quad (1)$$

$$\text{Feature Vector} = [\text{SNRFirst}, \text{SNRMain} - \text{SNRFirst}, \text{AoA}] \quad (2)$$

$$\text{Feature Vector} = [\text{SNRFirst}, \text{SNRMain}, \text{ToAGap}, \text{AoA}] \quad (3)$$

$$\text{Feature Vector} = [\text{SNRFirst}, \text{SNRMain} - \text{SNRFirst}, \text{ToAGap}, \text{AoA}] \quad (4)$$

$$\text{Feature Vector} = [\text{SNRFirst}, \text{SNRMain}, \text{ToAGap}, \text{AoA}, \text{RSSI}] \quad (5)$$

$$\text{Feature Vector} = [\text{SNRFirst}, \text{SNRMain}, \text{ToAGap}, \text{AoA}, \text{variance}(\text{AoA}), \text{variance}(\text{range}), \text{variance}(\text{SNRFirst})] \quad (6)$$

$$\text{Feature Vector} = [\max(\text{SNRFirst}_1, \text{SNRFirst}_2), \min(\text{SNRMain}_1 - \text{SNRFirst}_1, \text{SNRMain}_2 - \text{SNRFirst}_2), \text{AoA}] \quad (7)$$

The feature SNRFirst corresponds to the first peak strength 612 (or the first peak strength 622) of FIG. 6 and the feature SNRMain corresponds to the strongest peak strength 614 (or the strongest peak strength 624) of FIG. 6. The feature ToAGap is the difference between first peak strength 612 and strongest peak strength 614. In certain embodiments, AoA measurements are estimated based on the phase difference from multiple antennas including, but not limited to, SNRFirst, SNRMain and ToAGap. If the electronic device is equipped with a single antenna or is operating with only a single antenna, then the AoA measurements cannot be measured and only a single CIR graph would be generated. Other features such as received signal strength indicator (RSSI) can be included in the input 502, such as described in the feature vector of Equation (5).

The features SNRFirst, SNRMain, and ToAGap correspond to an antenna of the electronic device. Therefore, if the measurement from multiple antennas for the features are present, each of those features can be obtained from either the same antenna or it can be a function of these CIR features obtained from different antennae. The antenna from which each of those features is used depends on the corresponding hardware characteristics as suitable for classification.

Equation (2) and Equation (4) describes the feature vector represented by a first peak strength 612 (denoted as SNRFirst), a difference between strongest peak strength 614 (SNRMain) and first peak strength 612, and AoA. Additionally, Equation (4) describes the feature vector that includes a feature corresponding to the time difference between first peak strength 612 and strongest peak strength 614 (ToAGap).

Additionally, the feature vector of Equation (7), SNRFirst, and SNRMain, are the CIR features obtained from antenna i. Therefore, if there are two antennas, SNRFirst$_1$ and SNRMain$_1$ correspond to the first antenna, and SNRFirst$_2$ and SNRMain$_2$ correspond to the second antenna.

The input 504 of FIGS. 5A, 5B, and 5C include measurements based on the received signals that are communicated between the electric device and the target device. In certain embodiments, the input 504 includes UWB measurements. The measurements can include as range (distance in meters, centimeters or other distance based metrics) measurements and AoA (in degrees, radians or other angle based metrics) measurements.

In certain embodiments, the measurements of the input 502 are used by the initial FoV classifier 510 for classical machine learning. For example, the measurements of the input 502 include statistics, such as the mean and variance, on the range measurements and raw AoA measurements.

The initial FoV classifier 510 performs an initial FoV or out-of-FoV prediction about the target device based on the input 502 (including the UWB features). In certain embodiments, the initial FoV classifier 510 uses UWB measurements and features which include range and AoA along with other CIR features. In certain embodiments, the initial FoV classifier 510 includes multiple initial FoV classifiers.

In certain embodiments, the initial FoV classifier 510 uses deterministic logic, a classical machine learning classifier, a deep learning classifier, or a combination thereof to generate an initial prediction of a presence of the target device relative to a FoV of the electronic device. In certain embodiments, the classification of the initial FoV classifier 510 labels the target device as in 'FoV' or 'out-of-FoV' of the electronic device based on the input 502. The classifiers that can be used in the initial FoV classifier 510 include, but are not limited to, K-Nearest Neighbors (KNN), Support Vector Machine (SVM), Decision Tree, Random Forest, Neural Network, Convolutional Neural Network (CNN), Long Short Term Memory (LSTM), and the like.

Training data for the classifier of the initial FoV classifier 510 can be collected by obtaining multiple measurements between the electronic device and the target device in FoV and out-of-FoV in both LOS and NLOS scenarios. To add variation to the training data, measurements can be taken at different ranges between the electronic device and the target device up to a maximum usable range. Also, the environment of data collection can be varied. For example, the training data can be collected in an open space environment or in a cluttered environment prone to multipath. Additional variations can also be added to the training data such as by changing the tilting angle of the electronic device, the target device, or both devices. Similarly, the training data can include further variations such as by rotating the target device at different angles. The measurements can be labeled as per the application depending on which scenario or setup is required to be labeled as FoV and which one is supposed to be out-of-FoV.

There are several ways in which certain features from the input 502 (such as the SNRFirst, SNRMain, ToAGap, and the like) can be used by the initial FoV classifier 510 to predict when the target device is in FoV of the electronic device. For example, when a direct signal path between the electronic device and the target device exists (such as under a LOS or in FoV scenario), SNRFirst and SNRMain are close and ToAGap is near-zero. In contrast, in NLOS or out-of-FoV scenario, the first peak strength 612, representing the direct signal path, is likely to be of lower magnitude and far from the strongest peak strength 614, which represents the reflected signal path. Therefore, in the NLOS or out-of-FoV scenario SNRFirst is likely smaller than SNRMain and ToAGap is likely to be large. In the cases when the signal quality is bad, the first peak strength 612 the strongest peak strength 614 are susceptible to drifting and likely to have smaller magnitude, thus the difference between SNRFirst and SNRMain, as well as the ToaGap are good indicators of whether the target device is in the FoV of the electronic device.

Variance of some of the features (such as variance of range, variance of the AoA, and variance of SNRFirst), over a certain sliding window also provide information that is useful for the initial FoV classifier 510. For example, if the window size is K, a buffer is maintained that stores previous K measurements of the features over which the variance is calculated and used in the feature vector. Instead of variance, other metrics that can measure the spread of the features can also be used.

In certain embodiments, the initial FoV classifier 510 includes an SVM classifier for classifying the target device in FoV or out-of-FoV using a feature vector of Equation (2). Additionally, the initial FoV classifier 510 includes an SVM classifier with a Gaussian kernel for classifying the target device in FoV or out-of-FoV using a feature vector of Equation (2).

SVM training involves finding a hyperplane in the N-dimensional feature space that can separate the data points in the two classes. For a data point $x_i$, if $y_i \in \{1, -1\}$ represents the corresponding label, with a positive label representing FoV and a negative label representing out-of-FoV. The optimization problem of SVM is defined as shown in Equation (8), such that Equations (9) and (10) are satisfied.

$$\min_{w,b,\xi} \frac{1}{2} w^T w + C \sum_i \xi_i \qquad (8)$$

$$y_i(w^T \phi(x_i) + b) \geq 1 - \xi_i, \text{ for all } i \qquad (9)$$

$$\xi_i \geq 0, \text{ for all } i \qquad (10)$$

Here, C>0 represents the penalty on the error term and $\phi(x_i)$ is the projection of data point $x_i$ to a higher dimensional space.

One way of solving this minimization problem is by solving the following dual problem of Equation (11), such that Equations (12) and (13) are satisfied.

$$\max_{\lambda \geq 0} -\frac{1}{2} \sum_i \sum_j \lambda_i \lambda_j y_i y_j \phi(x_i)^T \phi(x_j) + \sum_i \lambda_i \qquad (11)$$

$$\sum_i \lambda_i y_i = 0 \qquad (12)$$

$$0 \leq \lambda_i \leq C, \text{ for all } i \qquad (13)$$

If training data in the positive and negative classes are not balanced, the error between the two classes can be evenly distributed by using a different penalty for positive and negative class and modifying the minimization problem as shown in Equation (14), such that Equations (15) and (16) are satisfied. For example, if the data in the two classes is not balanced, then the error between two classes is evenly distributed by penalizing the two classes by a value that is inversely proportional to the amount of data in the class. One example is to use the penalty values as shown in Equation (17).

$$\min_{w,b,\xi} \frac{1}{2} w^T w + C_+ \sum_{i: y_i=1} \xi_i + C_- \sum_{i: y_i=-1} \xi_i \qquad (14)$$

$$y_i(w^T \phi(x_i) + b) \geq 1 - \xi_i, \text{ for all } i \qquad (15)$$

$$\xi_i \geq 0, \text{ for all } i \qquad (16)$$

$$C_+ = \frac{c}{\#\text{Positive class data}}, C_- = \frac{c}{\#\text{Negative class data}} \qquad (17)$$

In certain embodiments, if the FoV features in LOS and NLOS are highly distinct, then the initial FoV classifier 510 could use a multi-class classifier that can distinguish between the following classes (i) LOS FoV (ii) NLOS FoV (iii) LOS out-of-FoV and (iv) NLOS out-of-FoV. In certain embodiments, the initial FoV classifier 510 uses a multi-class classifier to label (i) LOS FoV, (ii) NLOS FoV and (iii) NLOS. FoV. In certain embodiments, the initial FoV classifier 510 uses a multi-class classifier as described in FIG. 7, below.

In certain embodiments, if out-of-FoV data is not available or not sufficient for training, then a one-class classifier can be trained using just the FoV data, such as a Support Vector Data Description (SVDD) classifier.

If a classifier of the initial FoV classifier 510 lacks satisfactory performance due to the feature vector (of the input 502) not covering the spread of features in some specific environment (due to variance of AoA, range and SNRFirst, and the like), then a more directed classifier based on additional manual logic can be included in the initial FoV classifier 510 for correcting the decision of the first classifier. Variance of the features can provide information about the target being in FoV or out of FoV. Features do not vary much or vary smoothly when the target is in FoV, while fluctuations of these features increase in an out-of-FoV scenario. As such, the manual logic can utilize information about the spread of the features to correct the decision of the classifier of the initial FoV classifier 510.

That is, the initial FoV classifier 510 can determine to change the decision of a classifier based on the variances of the input. For example, if the output of a classifier of the initial FoV classifier 510 is out of FoV and the variance of AoA is below a threshold while AoA∈FoV, the initial FoV classifier 510 can determine to change the output (from out of FoV) to FoV. Similarly, if the output of a classifier of the initial FoV classifier 510 is FoV, but the variance of AoA is above a threshold and variance of range is above a range variance threshold, the initial FoV classifier 510 can determine to change output (from FoV) to out of FoV.

For another example, if the output of a classifier of the initial FoV classifier 510 is out-of-FoV, but ToAGap is below a threshold while AoA∈FoV, the initial FoV classifier 510 can determine to change the output (from out of FoV) to FoV. Similarly, if the output of a classifier of the initial FoV classifier 510 is out-of-FoV, but SNRMain-SNRFirst is below its corresponding threshold while AoA∈FoV, the initial FoV classifier 510 can determine to change the output (from out of FoV) to FoV. Alternatively, if the output of a classifier of the initial FoV classifier 510 is FoV, but variance of SNRFirst is above a threshold (or variance of range is above a threshold), then the initial FoV classifier 510 can determine to change the output (from FoV) to out-of-FoV.

In certain embodiments, the initial FoV classifier 510 uses a sliding window to smooth the output of the classifier and remove outliers. For example, the initial FoV classifier 510 can label the target device as being within the FoV or out of the FoV and generate a probability (confidence score) associated with the label. The sliding window can average the output probability and compare the average to a threshold. Based on the comparison, the initial FoV classifier 510 generates the initial prediction of whether the target device is within the FoV of the electronic device. This is described in FIG. 8A, below. Similarly, the sliding window can average the label and compare the average to a threshold. Based on the comparison, the initial FoV classifier 510 generates the initial prediction of whether the target device is within the FoV of the electronic device. This is described in FIG. 8B, below. That is, by averaging the probability, the label, or both, removes outliers and smooths the final result of the initial FoV classifier 510.

Figure 11:
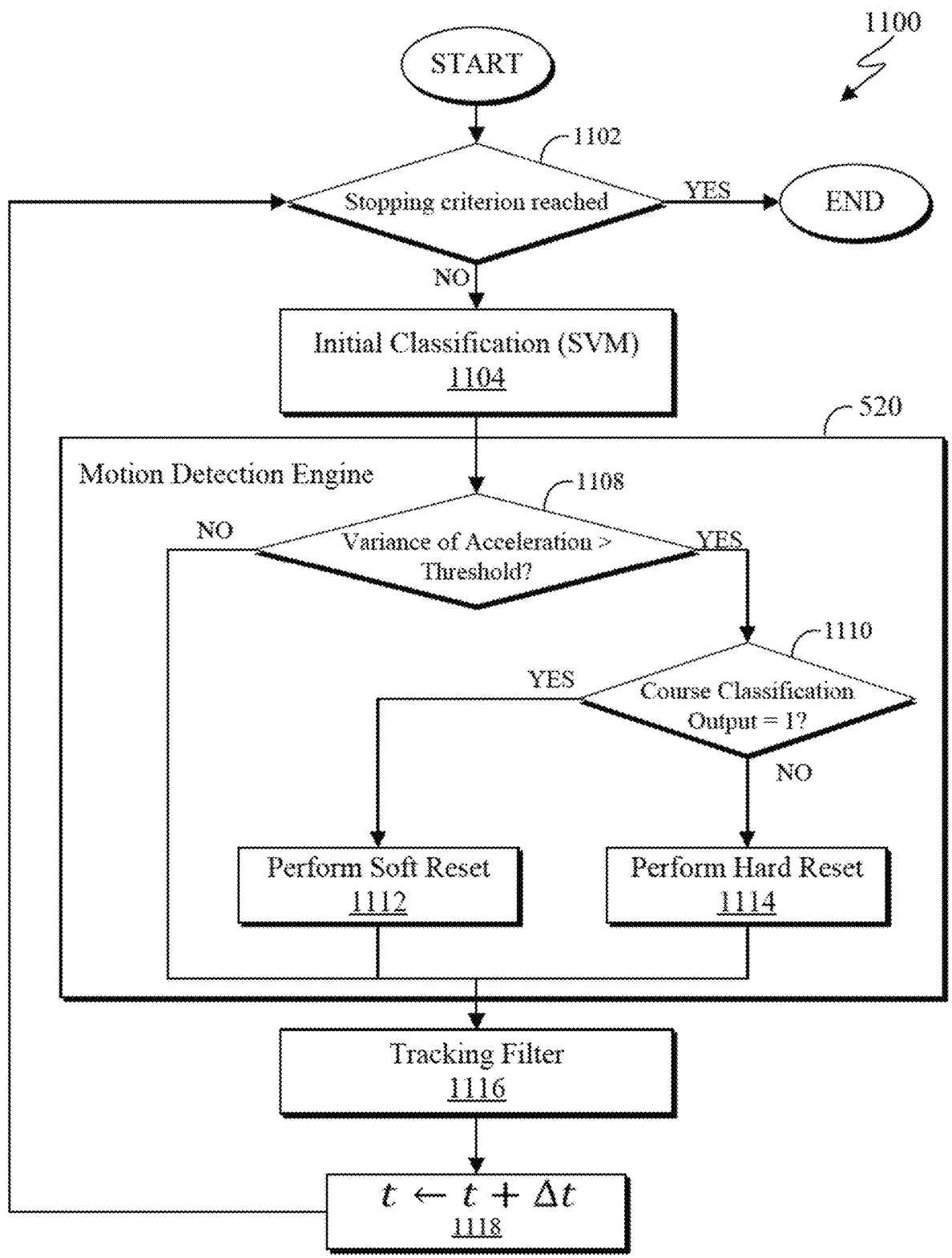
FIG. 11 illustrates an example method for performing a reset due to motion according to embodiments of the present disclosure.

The motion detection engine 520 determines whether motion of the electronic device that exceeds a threshold is detected. When the motion detection engine 520 determines that motion exceeded a threshold, then the motion detection engine 520 can initiate a reset. For example, the motion detection engine 520 monitors measurements from a motion sensor (such as one or more of gyroscope, accelerometer, magnetometer, inertial measurement unit, and the like) of the electronic device. The motion detection engine 520 can initiate a reset operation when a detected motion exceeds a threshold. For example, a sudden motion can cause the tracking filter operation 530 to drift which takes time for the tracking filter operation 530 to converge again. Therefore, when a detected motion exceeds a threshold, the motion detection engine 520 can initiate a reset operation to reset the tracking filter of the tracking filter operation 530. In certain embodiments, the motion detection engine 520 is omitted such as when the electronic device lacks a motion sensor. The signal processing diagram 500b of FIG. 5B and the signal processing diagram 500c of FIG. 5B illustrate signal processing without the motion detection engine 520. FIG. 11 describes the motion detection engine 520 in greater detail.

If the electronic device is equipped with a motion sensor (such as a motion sensor that is included in the sensor module 376 of FIG. 3 or a motion sensor that is included in the sensor 265 of FIG. 2), information about the motion and orientation change of the device from this sensor can be used in the tracking filter to further improve the quality of range and AoA measurements.

The tracking filter operation 530 uses one or more tracking filters to smooth the range and AoA measurements via the input 504. In certain embodiments, more than one tracking filter can be used where each tracking with a different hypothesis. Example tracking filters include a Kalman filter, an extended Kalman filter, a particle filter, and the like. The tracking filter operation 530 generates output 532. The output 532 can include smoothed range (in meters, centimeters or other distance based metrics). The output 532 can also include the smoothed AoA (in degrees, radians or other angle based metrics). FIGS. 9A, 9B, 9C, and 9D describe the tracking filter operation 530 in greater detail.

Figure 10:
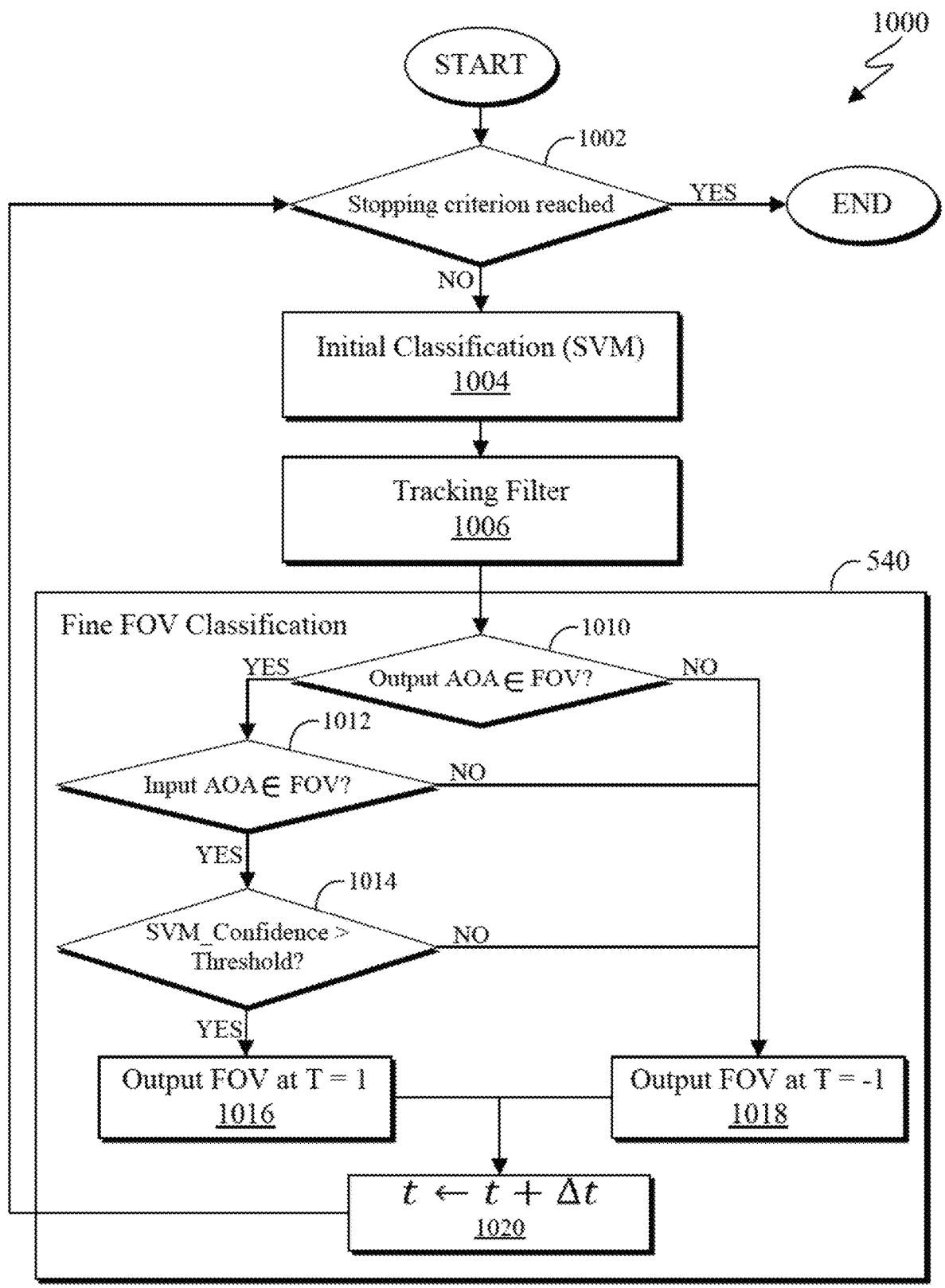
FIG. 10 illustrates an example method for determining whether a target device is within the FoV of an electronic device according to embodiments of the present disclosure.

The fine FoV classifier 540 combines the decision 512 from initial FoV classifier 510 and the tracking filter operation 530 to generate output 542. For example, the fine FoV classifier 540 combines the decision 512, from initial FoV classifier 510, and output 532, generated by the tracking filter operation 530, to generate the output 542. The output 542 indicates whether the target device is within the FoV or outside the FoV of the external electronic device. In certain embodiments, the decision of the fine FoV classifier 540 is a numerical value. For example, when the value is one (1) indicates that the target device is within the FoV of the electronic device and when the value is negative one (−1) indicates that the target device is outside (not within) the FoV of the electronic device. In certain embodiments, the output 542 also includes a FoV confidence indicating the confidence or probability that the target device is in FoV or out of the FoV, as determined by the fine FoV classifier 540. The confidence score of the decision of the fine FoV classifier 540 is based on confidence scores from the initial FoV classifier 510 and the tracking filter operation 530. FIG. 10 describes the fine FoV classifier 540 in greater detail.

In certain embodiments, the rate of input and output of the post processor can be the same as the rate of ranging measurements.

The signal processing diagram 500c of FIG. 5C is similar to the signal processing diagram 500a and 500b with the omission of the fine FoV classifier 540 and the motion detection engine 520. As illustrated in the signal processing diagram 500c of FIG. 5C, the tracking filter operation 530 receives the input 504 (range measurements and AoA measurements). The tracking filter operation 530 smooths the AoA measurements and the range measurements and generates output 532 including the smoothed range and the smoothed AoA. These filtered (smoothed) measurements along with other UWB features (via the input 502) are provided to the initial FoV classifier 510. The initial FoV classifier 510 predicts whether the measurements are from a direct path (or a reflection) and whether the target lies in the FoV (or outside the FoV) of the electronic device based on the filtered (smoothed) measurements (generated by the tracking filters operation 530) along with the UWB features (via the input 502).

Figure 7:
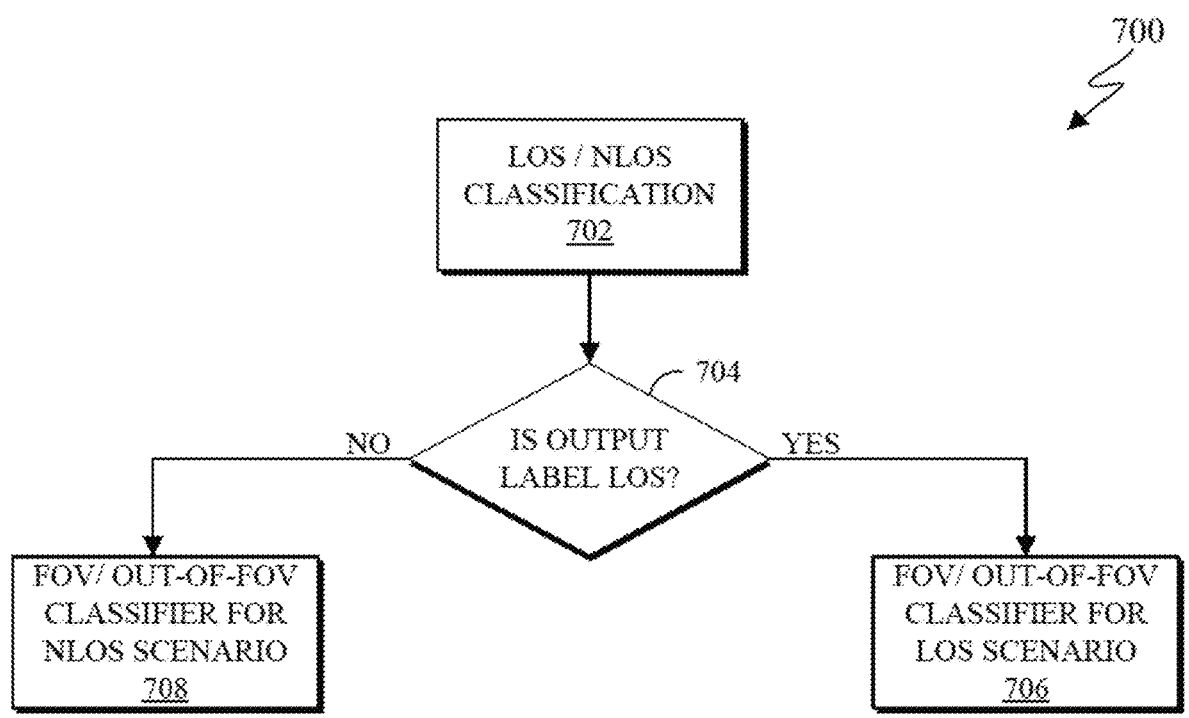
FIG. 7 illustrates example process for selecting a classifier for an initial FoV determination according to embodiments of the present disclosure.

FIG. 7 illustrates example method 700 for selecting a classifier for an initial FoV determination by the initial FoV classifier 510 according to embodiments of the present disclosure. The method 700 is described as implemented by any one of the client devices 106-114 of FIG. 1 and can include internal components similar to that of electronic device 200 of FIG. 2 and the electronic device 301 of FIG. 3. However, the method 700 as shown in FIG. 7 could be used with any other suitable electronic device and in any suitable system.

As illustrated in the method 700, a classifier of the initial FoV classifier 510 initially labels the scenario to be LOS or NLOS. Then another classifier of the initial FoV classifier 510 that is trained in that particular scenario labels the target to be in FoV or out-of-FoV. That is, as illustrated in the method 700, the initial FoV classifier 510 uses three different classifiers. The first classifier is for LOS/NLOS detection, the second classifier for FoV/out-of-FoV detection in LOS scenario and the third for FoV/out-of-FoV detection in NLOS scenario.

In step 702, a classifier of the initial FoV classifier 510 labels the target device as either in LOS or NLOS, based on the input 502. In step 704, the initial FoV classifier 510 determines whether the classifier in step 702, classified the target device is LOS. When the target device is classified as LOS, then in step 706, the initial FoV classifier 510 selects a classifier that is trained for LOS scenarios. The selected classifier of step 706 then determines whether the target device is in FoV or out of the FoV of the electronic device. Alternatively, when the target device is classified as NLOS, then in step 708, the initial FoV classifier 510 selects a classifier that is trained for NLOS scenarios. The selected classifier of step 708 then determines whether the target device is in FoV or out of the FoV of the electronic device.

Although FIG. 7 illustrates an example method, various changes may be made to FIG. 7. For example, while the method 700 is shown as a series of steps, various steps could overlap, occur in parallel, occur in a different order, or occur multiple times. In another example, steps may be omitted or replaced by other steps.

FIGS. 8A and 8B illustrate example moving average filter diagrams 800a and 800b for an initial FoV prediction according to embodiments of the present disclosure. In certain embodiments, the moving average filter diagrams 800a and 800b can be used by any one of the client devices 106-114 or the server 104 of FIG. 1.

As illustrated in FIG. 8A, the classifier output 802 represents a probability that the target device is within the FoV at different time intervals as determined by a classifier of the initial FoV classifier 510. A sliding window moves along the classifier output 802 and averages the probability values within the window. For example, at a first time step, the sliding window 810a averages the first five the probability values and outputs the average in the mean output 804, as illustrated. At the second time step, the sliding window 810b moves one value to the right and averages the five the probability values and outputs the average in the mean output 804, as illustrated. This continues until sliding window 810n averages the final five probability values and outputs the average in the mean output 804, as illustrated. It is noted that in other embodiments, the sliding window can be different sizes.

Each value in the mean output 804 is then compared against a threshold value. If the average probability is greater than the threshold, then the initial FoV classifier 510 predicts that the output is in the FoV. Alternatively, if the average probability is less than the threshold, then the initial FoV classifier 510 predicts that the output is out of the FoV. As illustrated in FIG. 8A, the threshold is 0.5. For example, each value of the mean output 804 that is above 0.5, the output is the value of one, indicating that the target device is in the FoV of the electronic device.

As illustrated in FIG. 8B, the classifier output 820 represents the prediction of whether the target device at different time instances is in the FoV (as indicated by a value of one) or out of the FoV (as indicated by a value of negative one) of the electronic device. In certain embodiments, the classifier output 820 is the output 806 of FIG. 8A.

A sliding window moves along the classifier output 820 and averages the values within the window. For example, at a first time step, the sliding window 820a averages the first five the values and outputs the average in the majority voting output 830, as illustrated. At the second time step, the sliding window 810b moves one value to the right and averages the five the probability values and outputs the average in the majority voting output 830, as illustrated. This continues until sliding window 820n averages the final five probability values and outputs the average in the majority voting output 830, as illustrated. It is noted that in other embodiments, the sliding window can be different sizes.

FIGS. 9A, 9B, 9C, and 9D illustrate example methods 900a, 900b, 900c, and 900d, respectively, for various tracking filter operations according to embodiments of the present disclosure. The methods 900a, 900b, 900c, and 900d are described as implemented by any one of the client devices 106-114 of FIG. 1 and can include internal components similar to that of electronic device 200 of FIG. 2 and the electronic device 301 of FIG. 3. However, the methods 900a, 900b, 900c, and 900d as shown in FIGS. 9A, 9B, 9C, and 9D, respectively, could be used with any other suitable electronic device and in any suitable system.

The tracking filter operation 530 of FIGS. 5A, 5B, and 5C can use one or more different tracking filters to improve the quality of measurements. Example tracking filters include Kalman Filter, Extended Kalman Filter (EKF), EKF with adaptive values, a particle filter, and the like.

In certain embodiments, EKF is used to track UWB measurements. The state vector is defined in Equation (18), below. In Equation (18), $x_t$, $y_t$, $z_t$ are the position of the electronic device with respect to the target device, in three-dimensions. The observation is a function as defined in Equation (19). The observation of Equation (19) is dependent on the interface and design choice. For example, the observation could correspond to UWB measurements of range, AoA Azimuth and AoA elevation, as defined in Equation (20), below. Functions for mapping the measurements and the state can be defined in Equation (21), Equation (22), and Equation (23), below.

$$x_t = [x_t, y_t, z_t]^T \quad (18)$$

$$z_t = f(x_t) \quad (19)$$

$$z_t = [r_t, \theta_t, \varphi_t]^T \quad (20)$$

$$r_t = \sqrt{x_t^2 + y_t^2 + z_t^2} \quad (21)$$

$$az_t = \operatorname{atan}\left(\frac{x_t}{y_t}\right) \quad (22)$$

$$el_t = \operatorname{atan}\left(\frac{z_t}{\sqrt{x_t^2 + y_t^2}}\right) \quad (23)$$

When the observation is defined as in Equation (20), then the mapping function between the measurements and the state is defined in Equation (21) to Equation (23), above, and Equation (24) and Equation (25), below. The state transition equation is defined in Equation (26), below. It is noted that the expression $w_t$ of Equation (26) is the process noise and the state transition model A is the identity matrix. In certain embodiments, if the electronic device is equipped with a motion sensor (such as the sensor 265 of FIG. 23 or the sensor module 376), then a rotation matrix can be used as the state matrix A (instead of the identity matrix). A rotation matrix can be used to further improve the quality of the measurements.

$$\theta_t = 90 - az_t = \operatorname{atan}\left(\frac{y_t}{x_t}\right) \quad (24)$$

$$\varphi_t = 90 - el_t = \operatorname{atan}\left(\frac{\sqrt{x_t^2 + y_t^2}}{z_t}\right) \quad (25)$$

$$x_t = Ax_{t-1} + w_t \quad (26)$$

To account for imperfections in the motion model, Q, which represents the process noise covariance, can be tuned based on the real data. If P represents the error covariance matrix, R represents the measurement noise covariance matrix, and K represents the Kalman Gain, then R (the measurement noise covariance matrix) is determined using real data or measurements. One way to determine R is by obtaining measurements in the scenario where ground truth is known and calculating the variance of the difference between the measurements and ground truth. A Jacobian Matrix, is described in Equation (27), below. Alternatively, if the measurements are $r_t$, $az_t$, $el_t$, then the Jacobian Matrix, is described in Equation (28). The Jacobian as is described in Equation (29), below, describes the mapping function between the measurements and state. The filter is initialized by calculating the state $[x_0, y_0, z_0]^T$ (Equation (18), above) from the current measurements $[r_0, \omega_0, \varphi_0]^T$ (Equation (20), above) using the mapping function between them and the error covariance matrix is initialized to identity matrix. The Jacobian Matrix can be used to calculate K, the Kalman Gain.

$$H(i,j) = \frac{\partial f(x_t)i}{\partial x_j} = \begin{bmatrix} \frac{\partial r_t}{\partial x_t} & \frac{\partial r_t}{\partial y_t} & \frac{\partial r_t}{\partial z_t} \\ \frac{\partial \theta_t}{\partial x_t} & \frac{\partial \theta_t}{\partial y_t} & \frac{\partial \theta_t}{\partial z_t} \\ \frac{\partial \varphi_t}{\partial x_t} & \frac{\partial \varphi_t}{\partial y_t} & \frac{\partial \varphi_t}{\partial z_t} \end{bmatrix} \tag{27}$$

$$H(i,j) = \frac{\partial f(x_t)_i}{\partial x_j} = \begin{bmatrix} \frac{\partial r_t}{\partial x_t} & \frac{\partial r_t}{\partial y_t} & \frac{\partial r_t}{\partial z_t} \\ \frac{\partial az_t}{\partial x_t} & \frac{\partial az_t}{\partial y_t} & \frac{\partial az_t}{\partial z_t} \\ \frac{\partial el_t}{\partial x_t} & \frac{\partial el_t}{\partial y_t} & \frac{\partial el_t}{\partial z_t} \end{bmatrix} \tag{28}$$

$$H = \begin{bmatrix} \frac{x_t}{\sqrt{x_t^2+y_t^2+z_t^2}} & \frac{y_t}{\sqrt{x_t^2+y_t^2+z_t^2}} & \frac{z_t}{\sqrt{x_t^2+y_t^2+z_t^2}} \\ \frac{-y_t}{x_t^2+y_t^2} & \frac{x_t}{x_t^2+y_t^2} & 0 \\ \frac{z_t x_t}{(x_t^2+y_t^2+z_t^2)\sqrt{x_t^2+y_t^2}} & \frac{z_t y_t}{(x_t^2+y_t^2+z_t^2)\sqrt{x_t^2+y_t^2}} & \frac{-\sqrt{x_t^2+y_t^2}}{(x_t^2+y_t^2+z_t^2)} \end{bmatrix} \tag{28}$$

$$H = \begin{bmatrix} \frac{x_t}{\sqrt{x_t^2+y_t^2+z_t^2}} & \frac{y_t}{\sqrt{x_t^2+y_t^2+z_t^2}} & \frac{z_t}{\sqrt{x_t^2+y_t^2+z_t^2}} \\ \frac{y_t}{\sqrt{x_t^2+y_t^2}} & \frac{-x_t}{x_t^2+y_t^2} & 0 \\ \frac{-z_t x_t}{(x_t^2+y_t^2+z_t^2)\sqrt{x_t^2+y_t^2}} & \frac{-z_t y_t}{(x_t^2+y_t^2+z_t^2)\sqrt{x_t^2+y_t^2}} & \frac{\sqrt{x_t^2+y_t^2}}{(x_t^2+y_t^2+z_t^2)} \end{bmatrix} \tag{29}$$

Figure 9A:
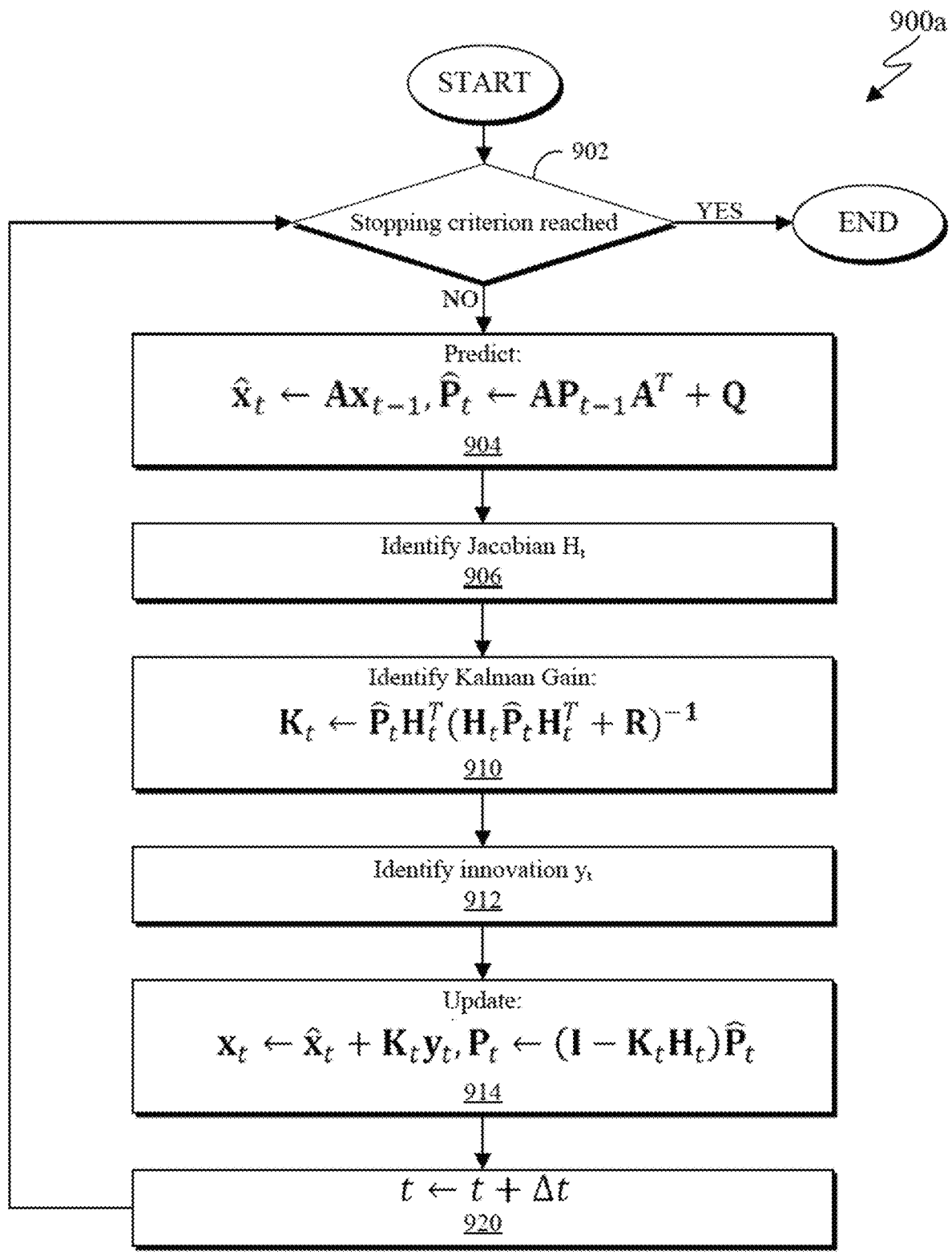
FIGS. 9A, 9B, 9C, and 9D illustrate example methods for various tracking filter operations according to embodiments of the present disclosure.

As illustrated in the FIG. 9A, the method 900a describes an Extended Kalman Filter for tracking range and AoA measurements. In step 902 the tracking filter operation 530 determines whether a stopping criteria is reached. The stopping criteria can be based on whether a new measurement was received. For example, as long as a new measurement is received the stopping criteria is not reached.

Upon determining that the stopping criteria is not reached, in step 904, the tracking filter operation 530 performs a prediction on the state, $\hat{x}$, as shown in Equation (30) and a prediction on the error covariance matrix, $\hat{P}$, as shown in Equation (31).

$$\hat{x}_t = A x_{t-1} \tag{30}$$

$$\hat{P}_t = A P_{t-1} A^T + Q \tag{31}$$

In step 906, the tracking filter operation 530 identifies the Jacobian Matrix as described above in Equations (27)-(29). In step 910, the tracking filter operation 530 uses the Jacobian Matrix (of step 906) to identify the Kalman Gain, as describe in Equation (32), below.

$$K_t = \hat{P}_t H_t^T (H_t \hat{P}_t H_t^T + R)^{-1} \tag{32}$$

In step 912, the tracking filter operation 530 identifies the innovation, $y_t$, as shown in Equation (33), below. The innovation is the difference between the measured value and the predicted value.

$$y_t = z_t - f(\hat{x}_t) = \begin{bmatrix} r_t \\ az_t \\ el_t \end{bmatrix} - \begin{bmatrix} \sqrt{\hat{x}_t^2 + \hat{y}_t^2 + \hat{z}_t^2} \\ \operatorname{atan}\left(\frac{\hat{x}_t}{\hat{y}_t}\right) \\ \operatorname{atan}\left(\frac{\hat{z}_t}{\sqrt{\hat{x}_t^2 + \hat{y}_t^2}}\right) \end{bmatrix} \tag{33}$$

In step 914, the tracking filter operation 530 updates the state, as shown in Equation (34) and the error covariance matrix, as shown in Equation (35). In step 920, the tracking filter operation 530 increases the time and returns to step 902.

$$x_t = \hat{x}_t + K_t y_t \tag{34}$$

$$P_t = (I - K_t H_t) \hat{P}_t \tag{35}$$

In certain embodiments, the process noise covariance, Q, the measurement noise covariance matrix R, or both, could be modified. For example, the process noise covariance, Q, can be adaptively adjusted based on the innovation of Equation (33), above, which is the difference between the predicted value and the measured value. If $\alpha \in [0,1]$ represents the forgetting factor for updating Q, then Q is updated, as described in Equation (36) below, using the innovation of Equation (33).

$$Q_t = \alpha Q_{t-1} + (1-\alpha)(K_t y_t y_t^T K_t^T) \tag{36}$$

Similarly, the measurement noise covariance matrix, R, can be adaptively adjusted based on a residual value, described in Equation (37), below. The residual value is the difference between the updated value and the measured value. If $\beta \in [0,1]$ represents the forgetting factor for updating R, then R is updated using the residual term as described in Equation (37), below.

$$\varepsilon_t = z_t - f(x_t) \tag{37}$$

$$R_t = \beta R_{t-1} + (1-\beta)(\varepsilon_t \varepsilon_t^T + H_t \hat{P}_t H_t^T) \tag{38}$$

Figure 9B:
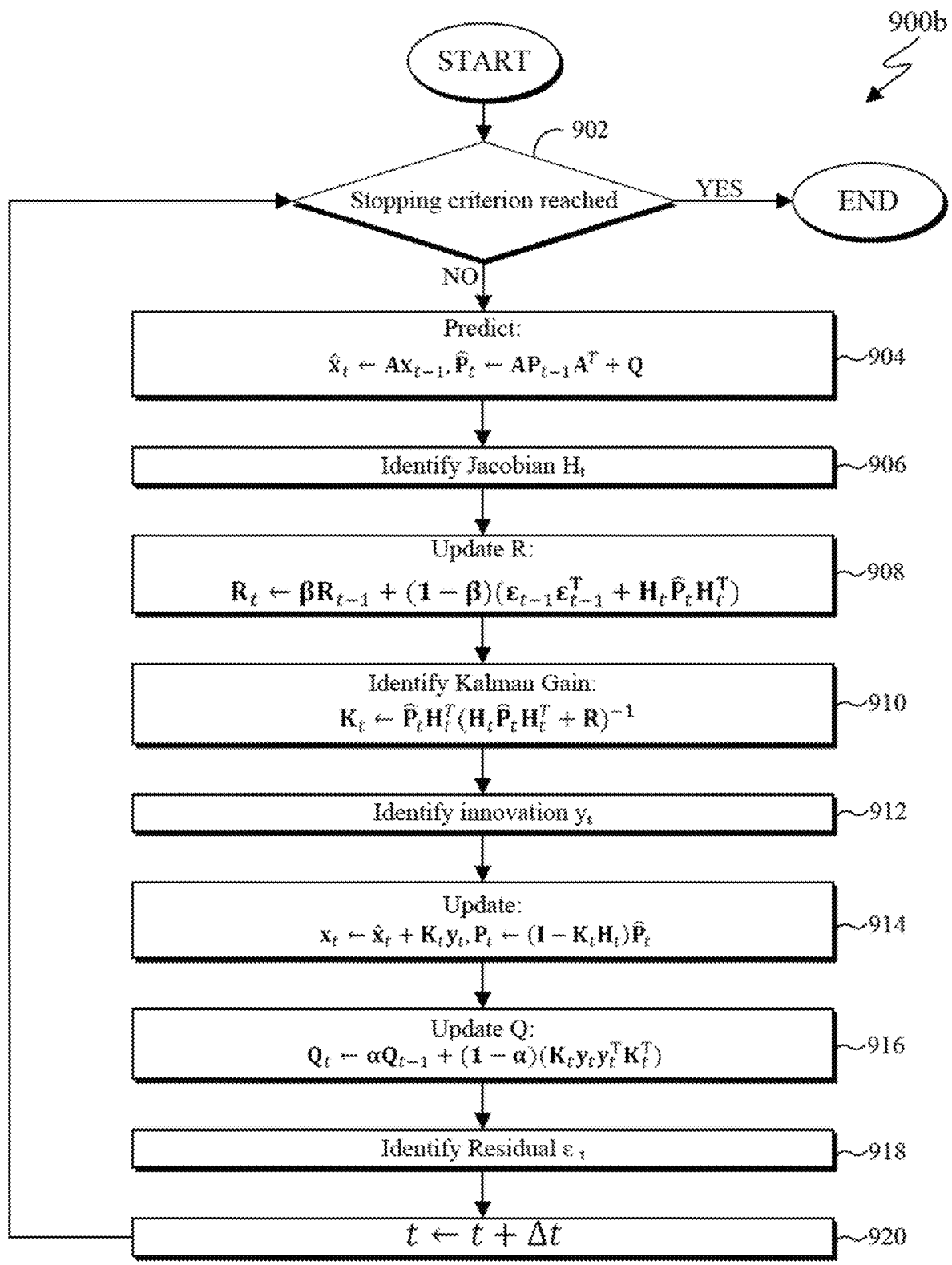

As illustrated in the FIG. 9B, the method 900b describes an Extended Kalman Filter with adaptive Q and R for tracking range and AoA measurements. In certain embodiments, both Q and R are adaptive. In other embodiments either Q or R is adaptive. When both Q and R are adaptive, then both of the steps 908 and 916 are performed. When only Q is adaptive (and R is not adaptive) then step 916 is performed and step 908 is omitted. Similarly, when only R is adaptive (and Q is not adaptive) then step 908 is performed and step 916 is omitted.

In step 902, tracking filter operation 530 determines whether a stopping criteria is reached. Upon determining that the stopping criteria is not reached, in step 904, the tracking filter operation 530 performs a perdition on the state, x̂, as shown in Equation (30) and performs a perdition on the error covariance matrix, P̂, as shown in Equation (31). In step 906, the tracking filter operation 530 identifies the Jacobian Matrix as described above in Equations (27)-(29). In step 908, the tracking filter operation 530 updates the measurement noise covariance matrix, R, based on the residual value of Equation (37). In step 910, the tracking filter operation 530 uses the calculated Jacobian Matrix (of step 906) to identifies the Kalman Gain, as describe in Equation (32). In step 912, the tracking filter operation 530 identifies the innovation, $y_t$, as shown in Equation (33). The innovation is the difference between the measured value and the predicted value. In step 914, the tracking filter operation 530 updates the state, as shown in Equation (34) and the error covariance matrix, as shown in Equation (35). In step 916, the tracking filter operation 530 updates the process noise covariance, Q, based on the innovation value of Equation (33) (of step 912). In step 918, the tracking filter operation 530 updates the residual based on Equation (37). In step 920, the tracking filter operation 530 increases the time and returns to step 902.

In certain embodiments, if orientation change of the device is not available, then the rotation matrix or the state transition matrix A is set to identity matrix as described above. When information about the motion of the device is not available, the tracking filter operation 530 uses a Kalman filter for tracking the target device. The state of the Kalman filter is modeled as described in Equation (39). The State transition matrix A=I. Measurements are erroneous range, AoA azimuth and AoA elevation obtained from UWB measurements is described in Equation (40). The measurement matrix H=I $$x_t = [r_t, \theta_t, \varphi_t]^T \qquad (39)$$

$$z_t = [r_t, az_t, el_t]^T \qquad (40)$$

Figure 9C:
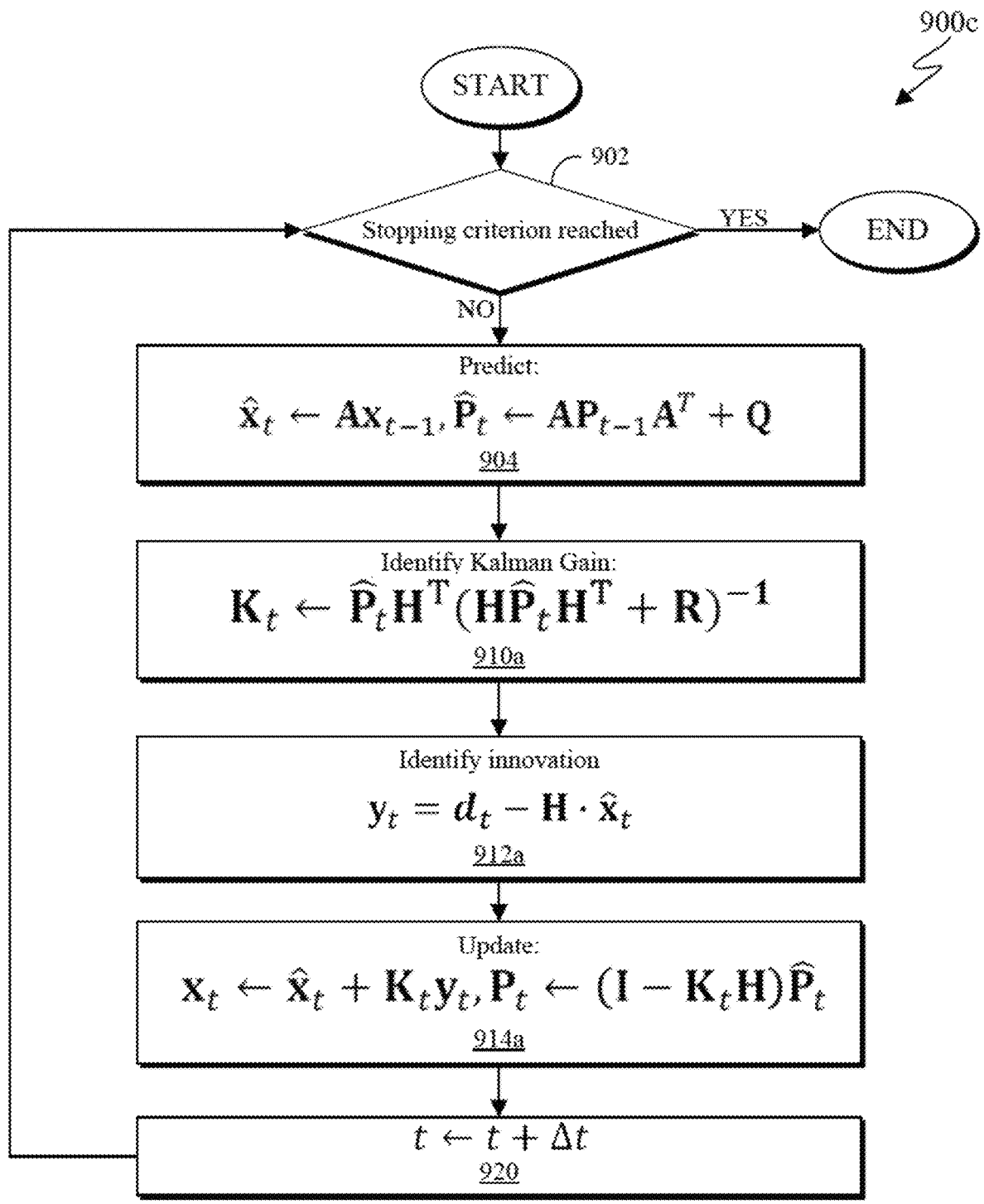

As illustrated in the FIG. 9C, the method 900c describes a Kalman Filter for tracking range and AoA measurements. In step 902, tracking filter operation 530 determines whether a stopping criteria is reached. Upon determining that the stopping criteria is not reached, in step 904, the tracking filter operation 530 performs a perdition on the state, x̂, as shown in Equation (30) and performs a perdition on the error covariance matrix, P̂, as shown in Equation (31). In step 910a, the tracking filter operation 530 identifies the Kalman Gain, as describe in Equation (41), below. In step 912a, the tracking filter operation 530 identifies the innovation, $y_t$, as shown in Equation (42), below. In step 914a, the tracking filter operation 530 updates the state, as shown in Equation (34) and the error covariance matrix, as shown in Equation (43). In step 920, the tracking filter operation 530 increases the time and returns to step 902.

$$K_t \leftarrow \hat{P}_t H^T (H \hat{P}_t H^T + R)^{-1} \qquad (41)$$

$$y_t = z_t - H \cdot \hat{x}_t \qquad (42)$$

$$P_t = (I - K_t H) \hat{P}_t \qquad (43)$$

In certain embodiments, during a NLOS scenarios the UWB measurements between the electronic device and the target device can get lost (such that the electronic device does not obtain the signals from the target device). When dealing with measurement loss, a motion sensor (if available) can be used to detect orientation changes of the electronic device to track AoA and range. When there are no UWB measurements, the tracking filter operation 530 can change the innovation term to zero.

Figure 9D:
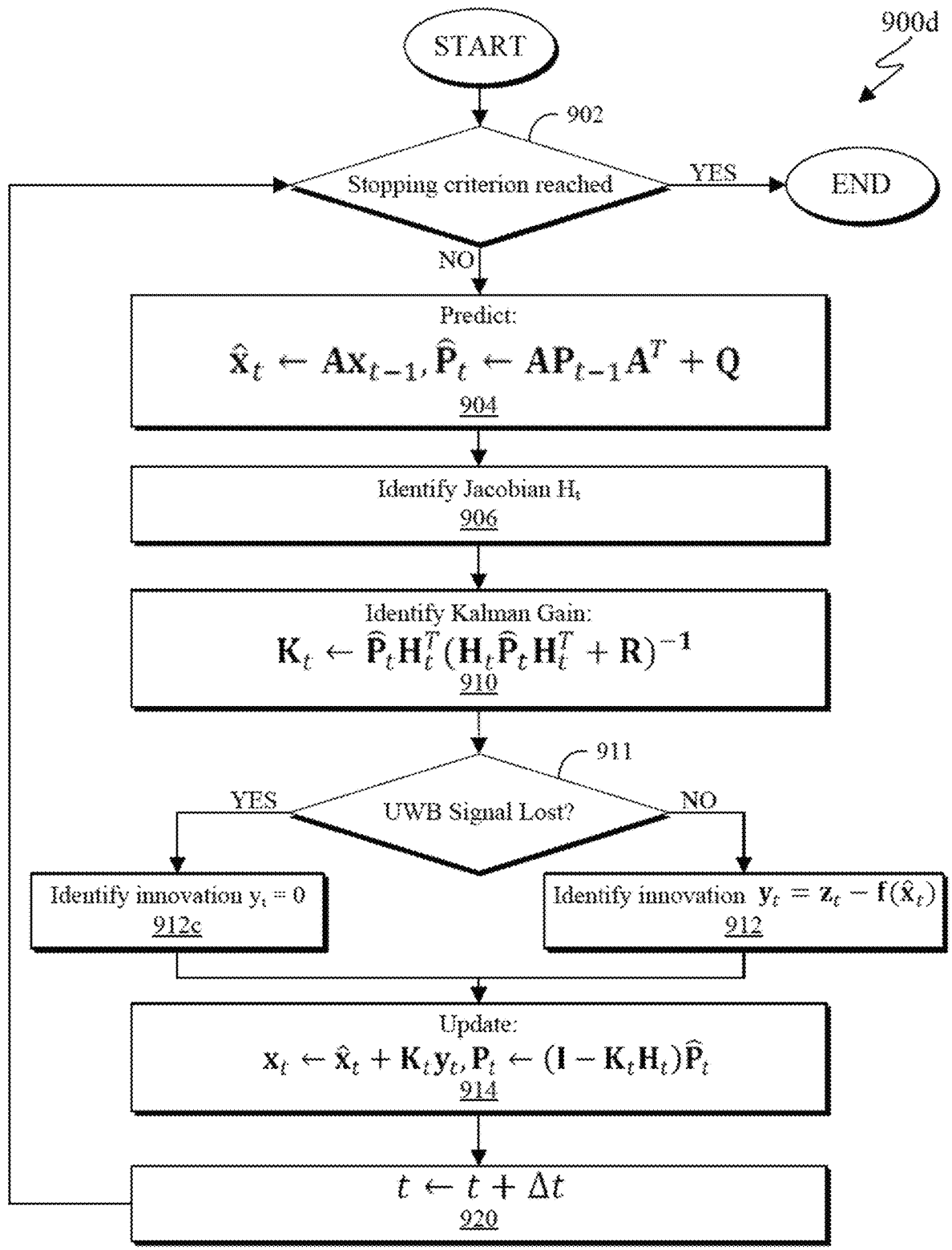

As illustrated in FIG. 9D, the method 900d describes tracking with partial measurement loss. In step 902, tracking filter operation 530 determines whether a stopping criteria is reached. Upon determining that the stopping criteria is not reached, in step 904, the tracking filter operation 530 performs a perdition on the state, x̂, as shown in Equation (30) and performs a perdition on the error covariance matrix, P̂, as shown in Equation (31). In step 906, the tracking filter operation 530 identifies the Jacobian Matrix as described above in Equations (27)-(29). In step 910, the tracking filter operation 530 uses the calculated Jacobian Matrix (of step 906) to identifies the Kalman Gain, as describe in Equation (32). In step 911 the tracking filter operation 530 determines whether the UWB measurements were lost (or not obtained). If the UWB measurements were lost, then in step 912c, the tracking filter operation 530 sets the innovation value, $y_t$, to zero. Alternatively, if the UWB measurements were received (not lost), then in step 912, the tracking filter operation 530 identifies the innovation, $y_t$, as shown in Equation (33). As discussed above, the innovation value, $y_t$, is the difference between the measured value and the predicted value. In step 914, the tracking filter operation 530 updates the state, as shown in Equation (34) and the error covariance matrix, as shown in Equation (35). In step 920, the tracking filter operation 530 increases the time and returns to step 902.

Although FIGS. 9A, 9B, 9C, and 9D illustrate example processes, various changes may be made to FIGS. 9A, 9B, 9C, and 9D. For example, while the method 900a is shown as a series of steps, various steps could overlap, occur in parallel, occur in a different order, or occur multiple times. In another example, steps may be omitted or replaced by other steps.

The FoV decision from the initial FoV classifier 510 and the tracking filter operation 530 can be associated with a confidence value which reflects the probability or the confidence of the current measurement to be from the target in FoV. For example, the FoV confidence of the initial FoV classifier 510 can be the probability of the target being in the FoV. For instance, if the initial prediction indicates that that target device is closer to the FoV boundary, then the confidence of the initial FoV classifier 510 is low. Alternatively, the initial prediction indicates that that target device is far to the FoV boundary, then the confidence of the initial FoV classifier 510 is high. For an SVM classifier, this probability is inversely proportional to the distance of the measurement from the hyperplane separating FoV and out-of-FoV. The confidence from SVM of the initial FoV classifier 510 is referred to as SVMConfidence.

Similarly, tracking filter operation 530 also outputs a confidence based on the estimated quantities. For example, an EKF confidence is calculated using the error covariance matrix as described in Equitation (44), below.

$$EKFConfidence_t = \min\left(1, \frac{c}{\text{trace}(P_t)}\right) \qquad (44)$$

Here, C is a constant parameter and trace($P_t$) is the trace of the square matrix $P_t$. That is, the EKF confidence is the confidence associated with the tracking state.

FIG. 10 illustrates an example method 1000 for determining whether the target device is within the FoV of an electronic device according to embodiments of the present disclosure. The method 1000 is described as implemented by any one of the client device 106-114 of FIG. 1 and can include internal components similar to that of electronic device 200 of FIG. 2 and the electronic device 301 of FIG. 3. However, the method 1000 as shown in FIG. 10 could be used with any other suitable electronic device and in any suitable system.

The fine FoV classifier 540 makes the final determination about whether the target device is in FoV of the electronic device by combining decisions of the initial FoV classifier 510 and tracking filter operation 530. In certain embodiments, SVMConfidence is compared against a predefined threshold. If it lies above the threshold, and input AoA and EKF output AoA both lie within the field of view, the final FoV decision specifies that the target device is in the FoV of the electronic device, otherwise the final FoV decision specifies that the target device is out of the FoV of the electronic device.

In step 1002 the electronic device determines whether a stopping criteria is reached. The stopping criteria can be based on whether a new measurement was received. For example, as long as a new measurement is received the stopping criteria is not reached.

Upon determining that the stopping criteria is not reached, the electronic device in step 1004, generates an initial prediction of a presence of the target device relative to a FoV of the electronic device. The electronic device can use the initial FoV classifier 510 of FIGS. 5A, 5B, and 5C. The initial prediction can be based on SVM. In certain embodiments, the electronic device generates a confidence score of the initial prediction.

In step 1006, the electronic device performs a tracking filter operation, such as the tracking filter operation 530 of FIGS. 5A, 5B, and 5C. The tracking filter operation can use various filters as described in the methods of FIGS. 9A-9D. The tracking filter operation can smooth the range information and the AoA information. In certain embodiments, the electronic device generates a confidence score output of the tracking filter.

The electronic device performs a fine FoV classification to determine whether the target device is within the FoV or outside the FoV of the electronic device. The determination can be based on the AoA information, the smoothed AoA information, and the initial prediction of the presence of the external electronic device relative to the FoV of the electronic device. In certain embodiments, the electronic device uses the fine FoV classifier 540 of FIGS. 5A and 5B to determine whether the target device is within the FoV or outside the FoV of the electronic device.

To determine whether the target device is within the FoV or outside the FoV of the electronic device, the fine FoV classifier initially determines, in step 1010, whether the smoothed AoA, which is output from the tracking filter of step 1006, is in the FoV. If the smoothed AoA of the target device is not in the FoV, then the fine FoV classifier 540 determines that the target device is not in the FoV (step 1018). Alternatively, upon determining that the smoothed AoA indicates that the target device is in the FoV, the fine FoV classifier 540, in step 1012, determines whether the input AoA is in the FoV. The input AoA is the AoA measurements that are input into the tracking filter of step 1006. If the input AoA of the target device is not in the FoV, then the fine FoV classifier 540 determines that the target device is not in the FoV (step 1018). Alternatively, upon determining that the input AoA indicates that the target device is in the FoV, the fine FoV classifier 540, in step 1014, compares the confidence score which is generated in step 1004 to a threshold. when the confidence score is less than the threshold, then the fine FoV classifier 540 determines that the target device is not in the FoV (step 1018). Alternatively, upon determining that the confidence score is greater than the threshold, the fine FoV classifier 540 determines that the target device is in the FoV of the electronic device (step 1016). In certain embodiments, the confidence score of the tracking filter (of step 1006) is compared against a threshold instead of the confidence score of the initial prediction (of step 1004), for determining whether the target device is within the FoV of the electronic device. In other embodiments, the confidence score of the tracking filter (of step 1006) can be compared against a threshold as well as the confidence score of the initial prediction (of step 1004), for determining whether the target device is within the FoV of the electronic device. In step 1020, the tracking filter operation 530 increases the time and returns to step 1002.

In certain embodiments, upon determining that the target device is in the FoV or out of the FoV of the electronic device, the fine FoV classifier 540 can remove outliers and smooth the FoV determination. The fine FoV classifier 540 can utilize a sliding window, such as the diagram 800a of FIG. 8A and the diagram 800b of FIG. 8B.

For example, the output of step 1016 and of step 1018 over a period of time is illustrated as the classifier output 820 of FIG. 8B. At a first time step, the sliding window 820a averages the first five the values and outputs the average in the majority voting output 830, as illustrated. At the second time step, the sliding window 810b moves one value to the right and averages the five the probability values and outputs the average in the majority voting output 830, as illustrated. This continues until sliding window 820n averages the final five probability values and outputs the average in the majority voting output 830, as illustrated. It is noted that in other embodiments, the sliding window can be different sizes.

In certain embodiments, a confidence score of the fine FoV classifier 540 is generated. The confidence score of the fine FoV classification is based on the confidence score generated in step 1004 (via the initial FoV classifier 510) and the confidence score generated in step 1006 (via the tracking filter operation 530). To generate the confidence score of the fine FoV classifier 540 is described in Equation (45), below, where SVMConfidence is the confidence score generated in step 1004 (via the initial FoV classifier 510) and EKFConfidence is the confidence score generated in step 1006 (via the tracking filter operation 530).

$$\text{Output } FoV \text{ Confidence} = \frac{SVMConfidence + EKFConfidence}{2} \quad (45)$$

Although FIG. 10 illustrates an example method, various changes may be made to FIG. 10. For example, while the method 1000 is shown as a series of steps, various steps could overlap, occur in parallel, occur in a different order, or occur multiple times. In another example, steps may be omitted or replaced by other steps.

FIG. 11 illustrates an example method 1000 for performing a reset due to motion according to embodiments of the present disclosure. The method 1100 is described as implemented by any one of the client device 106-114 of FIG. 1 and can include internal components similar to that of electronic device 200 of FIG. 2 and the electronic device 301 of FIG. 3. However, the method 1100 as shown in FIG. 11 could be used with any other suitable electronic device and in any suitable system.

As illustrated in FIG. 5A, the signal processing diagram 500a includes a motion detection engine 520. The motion detection engine 520 can initiate a reset operation when a detected motion exceeds a threshold.

Sometimes there can be drastic changes in the motion of the electronic device. In such cases, a tracking filter of the tracking filter operation 530 may need a significant period of time to converge the measurements after a sudden motion of the electronic device occurs. Accordingly, embodiments of the present disclosure enable the electronic device to reset the state of the filter when a drastic or sufficiently large motion is detected.

For example, variance of acceleration can be obtained from a motion sensor of the electronic device. The motion detection engine 520 determines whether motion of the electronic device exceeds a threshold. When one or more motion samples exceed a threshold, the motion detection engine 520 triggers the reset operation. Depending on whether the output (initial prediction) of initial FoV classifier 500 is FoV or out-of-FoV, motion detection engine 520 performs a soft (partial) rest or a hard (full) reset. In soft reset, the state of the tracking filter (of the tracking filter operation 530) is reinitialized using the current range and AoA measurements based on the mapping function between the state and measurements, and error covariance matrix is reinitialized to identity matrix. In hard reset, the state of the tracking filter and error covariance matrix are reinitialized the same way as in soft reset, and a buffer is reset. The buffer that is reset includes the buffer that includes the initial predictions of the initial FoV classifier 510 if majority voting is performed to the output (FIG. 8B). Alternatively, the buffer that is reset includes (i) the confidence score of the initial FoV classifier 510 (such as SVMConfidence) if average probability thresholding is done on classifier output (FIG. 8A), and (ii) the buffer of the output decision of the fine FoV classifier 540 if majority voting is performed to the output (FIG. 8B).

As illustrated in FIG. 11, in step 1102, the electronic device determines whether a stopping criteria is reached. The stopping criteria can be based on whether a new measurement was received. For example, as long as a new measurement is received the stopping criteria is not reached.

Upon determining that the stopping criteria is not reached, the electronic device in step 1104, generates an initial prediction of a presence of the target device relative to a FoV of the electronic device. The electronic device can use the initial FoV classifier 510 of FIGS. 5A, 5B, and 5C. The initial prediction can be based on SVM. In certain embodiments, the electronic device generates a confidence score of the initial prediction.

The electronic device determines whether detected motion necessitates a reset to a tracking filter of the tracking filter operation 530, a buffer, or both. In certain embodiments, the electronic device uses the motion detection engine 520 to determine whether a reset is to be performed. In step 1108, the motion detection engine 520 detects motion and compares variances of the acceleration of the motion to a threshold.

When variances of the acceleration is larger than the threshold, the motion detection engine 520 determines, in step 1110, whether the output of the step 1104 (such as the initial prediction of the coarse FoV filter 510) indicates that the target device is in the FoV of the electronic device. When the initial prediction of the coarse FoV filter 510 indicates that the target device is in the FoV of the electronic device, the motion detection engine 520 performs a soft reset (step 1112). Alternatively, when the initial prediction of the coarse FoV filter 510 indicates that the target device is out of the FoV of the electronic device, the motion detection engine 520 performs a hard reset (step 1114).

When variances of the acceleration is less than the threshold or after a reset (such as the soft of step 1112 or the hard reset of step 1114) is performed, the electronic device performs the tracking filter operation 530, of step 1116. In step 1116, the electronic device performs a tracking filter operation, such as the tracking filter operation 530 of FIGS. 5A, 5B, and 5C. The tracking filter operation can use various filters as described in the methods of FIGS. 9A-9D. The tracking filter operation can smooth the range information and the AoA information. In certain embodiments, the electronic device generates a confidence score output of the tracking filter.

The electronic device can use the fine FoV classifier 540 of FIGS. 5A and 5B to determine whether the target device is within the FoV or outside the FoV of the electronic device based on the output of the step 1104 and the output of step 1116. In step 1118, the tracking filter operation 530 increases the time and returns to step 1102.

Although FIG. 11 illustrates an example method, various changes may be made to FIG. 11. For example, while the method 1100 is shown as a series of steps, various steps could overlap, occur in parallel, occur in a different order, or occur multiple times. In another example, steps may be omitted or replaced by other steps.

Figure 12:
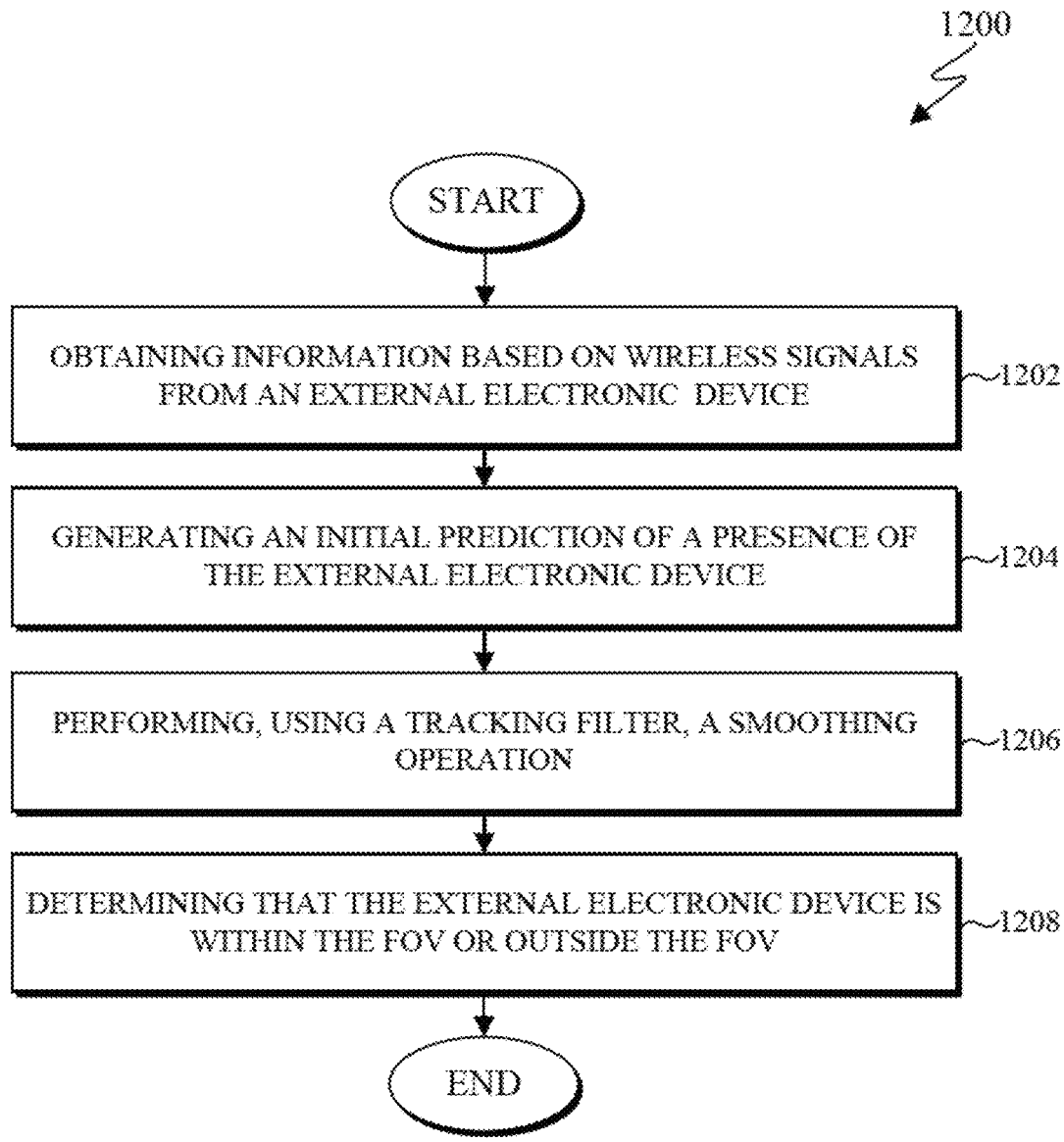
FIG. 12 illustrates an example method for FoV determination according to embodiments of the present disclosure.

FIG. 12 illustrates an example method 1200 for FoV determination according to embodiments of the present disclosure. The method 1200 is described as implemented by any one of the client device 106-114 of FIG. 1 and can include internal components similar to that of electronic device 200 of FIG. 2 and the electronic device 301 of FIG. 3. However, the method 1200 as shown in FIG. 12 could be used with any other suitable electronic device and in any suitable system.

In step 1202, the electronic device, obtains channel information, range information, and AoA information based on wireless signals communicated between an electronic device and an external electronic device. In certain embodiments, the electronic device includes a transceiver that obtains signals directly from an external electronic device (target device). In other embodiments, an electronic device, such as the server 104 of FIG. 1 obtains information associated with signals that are communicated between an electronic device and an external electronic device.

In certain embodiments, the channel information includes features of a CIR of a wireless channel between the electronic device and the external electronic device. The channel information can include. For example, the features of the CIR can include a first peak strength of the CIR. The features of the CIR can also include a strongest peak strength of the CIR. The features of the CIR further include an amplitude difference between the first peak strength and the strongest peak strength of the CIR. Additionally, the features of the CIR can include a RSSI value. The features of the CIR can also include a variance of the first peak strength of the CIR over a time interval. The features of the CIR can further include a time difference between the first peak strength of the CIR and the strongest peak strength of the CIR.

In certain embodiments, range information includes the range measurement obtained based on the wireless signals. The range information can also include a variances of the range measurement over a time interval.

In certain embodiments, the AoA information includes AoA measurement obtained based on the wireless signals. The AoA information can also include variances of the AoA measurement over a time interval.

In step 1204, the electronic device generates an initial prediction of a presence of the external electronic device relative to a FoV of the electronic device. The initial prediction can be based on the channel information, the range information, the AoA information, or any combination thereof. In certain embodiments, the initial prediction includes an indication of whether the external electronic device is within the FoV or outside the FoV of the electronic device. In certain embodiments, the initial prediction is based on SVM operating on the features of the CIR and at least one of the range information or the AoA information. A gaussian kernel can also be used to indicate whether the target is in or out of FOV using the feature vector.

In certain embodiments, the electronic device applies a moving average filter within a sliding window to the initial predictions to generate an average probability of being within the FoV. The electronic device then compares the average probability of being within the FoV within the sliding window to a threshold. Thereafter, the electronic device can revise the initial prediction of the presence of the external electronic device relative to the FoV of the electronic device based on the comparison to remove outliers.

In step 1206, the electronic device performs a smoothing operation on the range information and the AoA information using a tracking filter. In certain embodiments, the tracking filter is a Kalman Filter, an Extended Kalman Filter, an Extended Kalman Filter with adaptive parameters, an Extended Kalman Filter that accounts for lost measurements, or a combination there. For example, in response to determining that the wireless signals are not obtained, the electronic device can set a parameter that represents a difference between a measured value and a predicted value of the tracking filter to zero.

In step 1208, the electronic device, determines that the external electronic device is within the FoV or outside the FoV of the electronic device. For example, the electronic device determines whether the external electronic device is within the FoV or outside the FoV based on the AoA information, the smoothed AoA information (of step 1206), and the initial prediction (of step 1204).

In certain embodiments, the electronic device gathers multiple determinations of whether the external electronic device is within the FoV or outside the FoV of the electronic device. The electronic device then applies a moving average filter within a sliding window to the multiple determinations to generate an average probability of being within the FoV. The electronic device then compares the average probability of being within the FoV within the sliding window to a threshold. Thereafter, the electronic device can revise the multiple determinations of whether the external electronic device is within the FoV or outside the FoV of the electronic device based on the comparison to remove outliers.

In certain embodiments, the electronic device also generates a confidence score indicating a confidence associated with the determination of whether the external electronic device is within the FoV or outside the FoV of the electronic device. To generate the confidence score, the electronic device identifies a first confidence score associated with the initial prediction (of step 1204) and identifies a second confidence score associated with the tracking filter based on an error covariance matrix of the tracking filter. The first confidence score indicating a confidence associated with the initial prediction (of step 1204). In certain embodiments, the electronic device averages the first confidence score with the second confidence score to generate the final confidence score associated with the final decision of whether the external electronic device is within the FoV or outside the FoV of the electronic device.

Although FIG. 12 illustrates an example method, various changes may be made to FIG. 12. For example, while the method 1200 is shown as a series of steps, various steps could overlap, occur in parallel, occur in a different order, or occur multiple times. In another example, steps may be omitted or replaced by other steps.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
   obtaining channel information, range information, and angle of arrival (AoA) information based on wireless signals communicated between an electronic device and an external electronic device;
   generating an initial prediction of a presence of the external electronic device relative to a field of view (FoV) of the electronic device based on the channel information and at least one of the range information or the AoA information, wherein the initial prediction includes an indication of whether the external electronic device is within the FoV or outside the FoV of the electronic device;
   applying a moving average filter within a sliding window to the initial prediction of the presence of the external electronic device relative to the FoV of the electronic device;
   comparing an average probability of being within the FoV within the sliding window to a threshold;
   revising the initial prediction of the presence of the external electronic device relative to the FoV of the electronic device based on the comparison;
   performing, using a tracking filter, a smoothing operation on the range information and the AoA information to generate smoothed AoA information and smoothed range information; and
   determining that the external electronic device is within the FoV or outside the FoV of the electronic device based on the AoA information, the smoothed AoA information, and the initial prediction of the presence of the external electronic device relative to the FoV of the electronic device.

2. The method of claim 1, further comprising:
determining to reset the tracking filter based on a comparison of motion of the electronic device to a second threshold;
when the predicted presence of the external electronic device is within the FoV of the electronic device, performing a reset to the tracking filter; and
when the predicted presence of the external electronic device is outside the FoV of the electronic device, performing a reset to the tracking filter and a buffer that stores the initial prediction.

3. The method of claim 1, wherein:
the channel information comprises features of a channel impulse response (CIR) of a wireless communication channel based on the wireless signals between the electronic device and the external electronic device; and
the features of the CIR include at least one of:
a first peak strength of the CIR,
a strongest peak strength of the CIR,
an amplitude difference between the first peak strength and the strongest peak strength of the CIR,
a received signal strength indicator (RSSI) value,
a variance of the first peak strength of the CIR over a time interval, or
a time difference between the first peak strength of the CIR and the strongest peak strength of the CIR.

4. The method of claim 3, wherein the initial prediction of the presence of the external electronic device relative to the FoV of the electronic device is based on a support vector machine (SVM) operating on the features of the CIR and at least one of the range information or the AoA information.

5. The method of claim 1, wherein the tracking filter is a Kalman Filter, an Extended Kalman Filter, or an Extended Kalman Filter with adaptive parameters.

6. The method of claim 5, further comprising:
determining whether the wireless signals are not obtained; and
in response to determining that the wireless signals are not obtained, setting a parameter to zero, wherein the parameter represents a difference between a measured value and a predicted value of the tracking filter.

7. The method of claim 1, wherein determining that the external electronic device is within the FoV of the electronic device further comprises:
identifying a confidence score associated with the initial prediction of the presence of the external electronic device relative to the FoV of the electronic device;
determining whether the smoothed AoA information indicates that the external electronic device is within the FoV of the electronic device;
in response to determining that the smoothed AoA information indicates that the external electronic device is within the FoV of the electronic device, determining whether the AoA information indicates that the external electronic device is within the FoV of the electronic device;
in response to determining that the AoA information indicates that the external electronic device is within the FoV of the electronic device, comparing the confidence score to a second threshold; and
determining that the external electronic device is within the FoV or outside the FoV of the electronic device based on the comparison of the confidence score to the second threshold.

8. The method of claim 7, further comprising:
gathering multiple determinations of whether the external electronic device is within the FoV or outside the FoV of the electronic device;
applying a second moving average filter within a second sliding window to the multiple determinations;
comparing an average probability of being within the FoV within the second sliding window to a third threshold; and
revising the multiple determinations of whether the external electronic device is within the FoV or outside the FoV of the electronic device based on the comparison.

9. The method of claim 7, wherein:
the confidence score is a first confidence score; and
the method further comprises:
identifying a second confidence score associated with the tracking filter based on an error covariance matrix of the tracking filter, and
generating a final confidence score associated with the determination that the external electronic device is within the FoV or outside the FoV of the electronic device based on the first confidence score and the second confidence score.

10. An electronic device, comprising:
a processor configured to:
obtain channel information, range information, and angle of arrival (AoA) information based on wireless signals communicated between the electronic device and an external electronic device;
generate an initial prediction of a presence of the external electronic device relative to a field of view (FoV) of the electronic device based on the channel information and at least one of the range information or the AoA information, wherein the initial prediction includes an indication of whether the external electronic device is within the FoV or outside the FoV of the electronic device;
apply a moving average filter within a sliding window to the initial prediction of the presence of the external electronic device relative to the FoV of the electronic device;
compare an average probability of being within the FoV within the sliding window to a threshold;
revise the initial prediction of the presence of the external electronic device relative to the FoV of the electronic device based on the comparison;
perform, using a tracking filter, a smoothing operation on the range information and the AoA information to generate smoothed AoA information and smoothed range information; and
determine that the external electronic device is within the FoV or outside the FoV of the electronic device based on the AoA information, the smoothed AoA information, and the initial prediction of the presence of the external electronic device relative to the FoV of the electronic device.

11. The electronic device of claim 10, wherein:
the electronic device further comprises a buffer configured to store the initial prediction; and
the processor is further configured to:
determine to reset the tracking filter based on a comparison of motion of the electronic device to a second threshold;

when the predicted presence of the external electronic device is within the FoV of the electronic device, perform a reset to the tracking filter; and
when the predicted presence of the external electronic device is outside the FoV of the electronic device, perform a reset to the tracking filter and the buffer.

12. The electronic device of claim 10, wherein:
the channel information comprises features of a channel impulse response (CIR) of a wireless communication channel based on the wireless signals between the electronic device and the external electronic device; and
the features of the CIR include at least one of:
a first peak strength of the CIR,
a strongest peak strength of the CIR,
an amplitude difference between the first peak strength and the strongest peak strength of the CIR,
a received signal strength indicator (RSSI) value,
a variance of the first peak strength of the CIR over a time interval, or
a time difference between the first peak strength of the CIR and the strongest peak strength of the CIR.

13. The electronic device of claim 12, wherein the initial prediction of the presence of the external electronic device relative to the FoV of the electronic device, is based on a support vector machine (SVM) operating on the features of the CIR and at least one of the range information or the AoA information.

14. The electronic device of claim 10, wherein the tracking filter is a Kalman Filter, an Extended Kalman Filter, or an Extended Kalman Filter with adaptive parameters.

15. The electronic device of claim 14, wherein the processor is further configured to:
determine whether the wireless signals are not obtained; and
in response to a determination that the wireless signals are not obtained, set a parameter to zero, wherein the parameter represents a difference between a measured value and a predicted value of the tracking filter.

16. The electronic device of claim 10, wherein to determine that the external electronic device is within the FoV of the electronic device or outside the FoV of the electronic device, the processor is configured to:
identify a confidence score associated with the initial prediction of the presence of the external electronic device relative to the FoV of the electronic device;
determine whether the smoothed AoA information indicates that the external electronic device is within the FoV of the electronic device;
in response to determining that the smoothed AoA information indicates that the external electronic device is within the FoV of the electronic device, determine whether the AoA information indicates that the external electronic device is within the FoV of the electronic device;
in response to determining that the AoA information indicates that the external electronic device is within the FoV of the electronic device, compare the confidence score to a second threshold; and
determine that the external electronic device is within the FoV or outside the FoV of the electronic device based on the comparison of the confidence score to the second threshold.

17. The electronic device of claim 10, wherein the electronic device further comprises a transceiver configured to receive the wireless signals from the external electronic device.

18. The electronic device of claim 10, wherein the electronic device is remote from the external electronic device.

19. A non-transitory computer readable medium containing instructions that when executed cause at least one processor to:
obtain channel information, range information, and angle of arrival (AoA) information based on wireless signals communicated between an electronic device and an external electronic device;
generate an initial prediction of a presence of the external electronic device relative to a field of view (FoV) of the electronic device based on the channel information and at least one of the range information or the AoA information, wherein the initial prediction includes an indication of whether the external electronic device is within the FoV or outside the FoV of the electronic device;
apply a moving average filter within a sliding window to the initial prediction of the presence of the external electronic device relative to the FoV of the electronic device;
compare an average probability of being within the FoV within the sliding window to a threshold; and
revise the initial prediction of the presence of the external electronic device relative to the FoV of the electronic device based on the comparison;
perform, using a tracking filter, a smoothing operation on the range information and the AoA information to generate smoothed AoA information and smoothed range information; and
determine that the external electronic device is within the FoV or outside the FoV of the electronic device based on the AoA information, the smoothed AoA information, and the initial prediction of the presence of the external electronic device relative to the FoV of the electronic device.

20. The non-transitory computer readable medium of claim 19, wherein the instructions that when executed further cause the at least one processor to:
determine to reset the tracking filter based on a comparison of motion of the electronic device to a second threshold;
when the predicted presence of the external electronic device is within the FoV of the electronic device, perform a reset to the tracking filter; and
when the predicted presence of the external electronic device is outside the FoV of the electronic device, perform a reset to the tracking filter and a buffer that stores the initial prediction.

21. The non-transitory computer readable medium of claim 19, wherein:
the channel information comprises features of a channel impulse response (CIR) of a wireless communication channel based on the wireless signals between the electronic device and the external electronic device; and
the features of the CIR include at least one of:
a first peak strength of the CIR,
a strongest peak strength of the CIR,
an amplitude difference between the first peak strength and the strongest peak strength of the CIR,
a received signal strength indicator (RSSI) value,
a variance of the first peak strength of the CIR over a time interval, or
a time difference between the first peak strength of the CIR and the strongest peak strength of the CIR.

22. The non-transitory computer readable medium of claim 21, wherein the instructions that when executed further cause the at least one processor to use a support vector machine (SVM) operating on the features of the CIR and at least one of the range information or the AoA information to generate the initial prediction of the presence of the external electronic device relative to the FoV of the electronic device.

23. The non-transitory computer readable medium of claim 19, wherein the tracking filter is a Kalman Filter, an Extended Kalman Filter, or an Extended Kalman Filter with adaptive parameters.

24. The non-transitory computer readable medium of claim 23, wherein the instructions that when executed further cause the at least one processor to:
   determine whether the wireless signals are not obtained; and
   in response to determining that the wireless signals are not obtained, set a parameter to zero, wherein the parameter represents a difference between a measured value and a predicted value of the tracking filter.

25. The non-transitory computer readable medium of claim 19, wherein the instructions that when executed cause the at least one processor to determine that the external electronic device is within the FoV of the electronic device comprise instructions that when executed cause the at least one processor to:
   identify a confidence score associated with the initial prediction of the presence of the external electronic device relative to the FoV of the electronic device;
   determine whether the smoothed AoA information indicates that the external electronic device is within the FoV of the electronic device;
   in response to determining that the smoothed AoA information indicates that the external electronic device is within the FoV of the electronic device, determine whether the AoA information indicates that the external electronic device is within the FoV of the electronic device;
   in response to determining that the AoA information indicates that the external electronic device is within the FoV of the electronic device, compare the confidence score to a second threshold; and
   determine that the external electronic device is within the FoV or outside the FoV of the electronic device based on the comparison of the confidence score to the second threshold.

26. The non-transitory computer readable medium of claim 25, wherein the instructions that when executed further cause the at least one processor to:
   gather multiple determinations of whether the external electronic device is within the FoV or outside the FoV of the electronic device;
   apply a second moving average filter within a second sliding window to the multiple determinations;
   compare an average probability of being within the FoV within the second sliding window to a third threshold; and
   revise the multiple determinations of whether the external electronic device is within the FoV or outside the FoV of the electronic device based on the comparison.

27. The non-transitory computer readable medium of claim 25, wherein:
   the confidence score is a first confidence score; and
   the instructions that when executed further cause the at least one processor to:
      identify a second confidence score associated with the tracking filter based on an error covariance matrix of the tracking filter, and
      generate a final confidence score associated with the determination that the external electronic device is within the FoV or outside the FoV of the electronic device based on the first confidence score and the second confidence score.

\* \* \* \* \*